United States Patent
Sasaki et al.

(10) Patent No.: US 11,214,696 B2
(45) Date of Patent: Jan. 4, 2022

(54) MULTILAYER STRUCTURE AND METHOD FOR PRODUCING SAME, COATING LIQUID, PACKAGING MATERIAL, AND PROTECTIVE SHEET FOR ELECTRONIC DEVICES

(71) Applicant: KURARAY CO., LTD., Kurashiki (JP)

(72) Inventors: Ryoichi Sasaki, Kurashiki (JP);
Yasushi Morihara, Kurashiki (JP);
Masahiko Ota, Kurashiki (JP);
Masakazu Nakaya, Kurashiki (JP);
Hiroyuki Ogi, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 476 days.

(21) Appl. No.: 16/302,422

(22) PCT Filed: May 17, 2017

(86) PCT No.: PCT/JP2017/018586
§ 371 (c)(1),
(2) Date: Nov. 16, 2018

(87) PCT Pub. No.: WO2017/200020
PCT Pub. Date: Nov. 23, 2017

(65) Prior Publication Data
US 2019/0218403 A1     Jul. 18, 2019

(30) Foreign Application Priority Data

May 18, 2016  (JP) .............................. JP2016-099740
May 18, 2016  (JP) .............................. JP2016-099741
May 18, 2016  (JP) .............................. JP2016-099742

(51) Int. Cl.
*C09D 7/63*       (2018.01)
*B32B 9/00*       (2006.01)
(Continued)

(52) U.S. Cl.
CPC .................. *C09D 7/63* (2018.01); *A61J 1/10* (2013.01); *B32B 9/00* (2013.01); *B32B 9/045* (2013.01);
(Continued)

(58) Field of Classification Search
None
See application file for complete search history.

(56) References Cited

U.S. PATENT DOCUMENTS

| 4,015,050 | A | * | 3/1977 | Birchall | .................. | B05D 3/10 |
| | | | | | | 428/480 |
| 4,717,424 | A | * | 1/1988 | Wilfinger | .................. | C09C 1/62 |
| | | | | | | 106/286.5 |

(Continued)

FOREIGN PATENT DOCUMENTS

| EP | 3 351 378 A1 | 7/2018 |
| JP | 61-296072 A | 12/1986 |

(Continued)

OTHER PUBLICATIONS

Nishide—JP 2005-013929 A—Euro D#4—MT—alumina+phosphate surface treatment—no inorganic—2005 (Year: 2005).*

(Continued)

*Primary Examiner* — Callie E Shosho
*Assistant Examiner* — John Vincent Lawler
(74) *Attorney, Agent, or Firm* — Oblon, McClelland, Maier & Neustadt, L.L.P.

(57) ABSTRACT

The present invention relates to a multilayer structure including a base (X) and a layer (Y), wherein
the layer (Y) includes an aluminum-containing compound (A) and a phosphorus compound (BH) in which a phosphorus atom having at least one hydroxy group and a polar group are bonded via an alkylene chain having 3 to 20 carbon atoms or a polyoxyalkylene chain based on an alkylene having 3 to 20 carbon atoms, and (Continued)

the aluminum-containing compound (A) is a compound (Ab) including a reaction product (D) of an aluminum-containing metal oxide (Aa) and an inorganic phosphorus compound (BI).

17 Claims, 4 Drawing Sheets

(51) Int. Cl.
  *C09D 7/61*   (2018.01)
  *A61J 1/10*   (2006.01)
  *B32B 9/04*   (2006.01)
  *B32B 9/06*   (2006.01)
  *B65D 65/40*   (2006.01)
  *B65D 65/42*   (2006.01)
  *B65D 81/20*   (2006.01)

(52) U.S. Cl.
  CPC ............... *B32B 9/06* (2013.01); *B65D 65/40* (2013.01); *B65D 65/42* (2013.01); *B65D 81/2023* (2013.01); *C09D 7/61* (2018.01); *B32B 2307/724* (2013.01); *B32B 2307/726* (2013.01); *B32B 2439/70* (2013.01)

(56) References Cited

U.S. PATENT DOCUMENTS

| | | | |
|---|---|---|---|
| 6,461,415 B1 * | 10/2002 | Sambasivan | C04B 35/63488 106/14.21 |
| 2010/0056678 A1 | 3/2010 | Zur Loye et al. | |
| 2013/0034674 A1 * | 2/2013 | Yoshida | B32B 7/12 428/35.2 |
| 2014/0248450 A1 * | 9/2014 | Sasaki | C04B 28/342 428/34.3 |
| 2014/0248500 A1 * | 9/2014 | Yoshida | C08J 7/0423 428/448 |
| 2015/0368503 A1 | 12/2015 | Sasaki et al. | |
| 2017/0226367 A1 * | 8/2017 | Inubushi | B32B 9/00 |

FOREIGN PATENT DOCUMENTS

| | | | | |
|---|---|---|---|---|
| JP | 2005/013929 | * | 1/2005 | ............... B05D 3/10 |
| JP | 2005-013929 A | | 1/2005 | |
| WO | WO 2006/012581 A2 | | 2/2006 | |
| WO | WO 2011/122036 A1 | | 10/2011 | |
| WO | WO 2014/122942 A1 | | 8/2014 | |
| WO | WO 2016/024382 A1 | | 2/2016 | |

OTHER PUBLICATIONS

TCI—Ethylenediaminetetrakis(mehtylenephosphonic acid)—May 18, 2021 (Year: 2021).*

International Search Report dated Aug. 15, 2017 in PCT/JP2017/018586 filed May 17, 2017.

Extended European Search Report dated Dec. 13, 2019, in Patent Application No. 17799444.9, 9 pages.

* cited by examiner

MULTILAYER STRUCTURE AND METHOD FOR PRODUCING SAME, COATING LIQUID, PACKAGING MATERIAL, AND PROTECTIVE SHEET FOR ELECTRONIC DEVICES

TECHNICAL FIELD

The present invention relates to a multilayer structure having good barrier properties and good cohesion, a method for producing the multilayer structure, a coating liquid for forming the multilayer structure, a packaging material, and a protective sheet for electronic devices.

BACKGROUND ART

Layered products in which a gas barrier layer containing aluminum or aluminum oxide as a component is formed on a plastic film have been conventionally well-known as barrier materials. Such layered products are used as packaging materials for protecting articles (such as foods) which are susceptible to quality change induced by oxygen. In many cases, such a gas barrier layer is formed on a plastic film by a dry process such as physical vapor deposition (PVD) or chemical vapor deposition (CVD).

For example, Patent Literature 1 discloses a composite structure having a gas barrier layer containing aluminum, the composite structure having a transparent gas barrier layer composed of a reaction product of aluminum oxide particles and a phosphorus compound. Patent Literature 1 also discloses a method for forming the gas barrier layer, in which a coating liquid containing aluminum oxide particles and a phosphorus compound is applied onto a plastic film, then dried and heat-treated.

In an attempt to allow such a composite structure to maintain gas barrier properties at a high level when exposed to physical stresses, Patent Literature 2 discloses that a layer containing a polymer having a plurality of phosphorus atoms is stacked contiguous to a layer containing aluminum atoms.

CITATION LIST

Patent Literature

Patent Literature 1: WO 2011/122036 A1
Patent Literature 2: WO 2014/122942 A1

SUMMARY OF INVENTION

Technical Problem

For the use of the multilayer structure disclosed in Patent Literature 1 or 2 as a packaging material, there is concern that delamination may occur between the gas barrier layer and a contiguous layer such as an adhesive layer and cause an appearance defect when the packaging material is subjected to retorting under such harsh conditions as a temperature above 120° C. with the packaged substance containing air or with the packaging material being bent. In addition, in some cases where the present inventors used the multilayer structure of Patent Literature 1 or 2 in an electronic device, the multilayer structure suffered from delamination after a damp heat test.

Thus, there is a demand for gas-barrier multilayer structures retaining good properties even after retorting or retaining good interlayer adhesion even at high temperature and high humidity.

An object of the present invention is to provide: a novel multilayer structure having good gas barrier properties and good water vapor barrier properties, being capable of maintaining the barrier properties even after retorting under harsh conditions, and retaining good interlayer adhesion (peel strength) without suffering from appearance defects such as delamination even after retorting under harsh conditions; a method for producing the multilayer structure; a coating liquid; and a packaging material.

Another object of the present invention is to provide a protective sheet for electronic devices that includes a novel multilayer structure having good gas barrier properties and good water vapor barrier properties and retaining good interlayer adhesion even at high temperature and high humidity.

Solution to Problem

As a result of intensive studies, the present inventors have found that the above objects can be achieved by providing a multilayer structure including a particular layer and have made the present invention on the basis of the finding.

The present invention provides a multilayer structure including a base (X) and a layer (Y), wherein
the layer (Y) contains an aluminum-containing compound (A) and a phosphorus compound (BH) in which a phosphorus atom having at least one hydroxy group and a polar group are bonded via an alkylene chain having 3 to 20 carbon atoms or a polyoxyalkylene chain based on an alkylene having 3 to 20 carbon atoms, and
the aluminum-containing compound (A) is a compound (Ab) including a reaction product (D) of an aluminum-containing metal oxide (Aa) and an inorganic phosphorus compound (BI).

In the multilayer structure of the present invention, the polar group of the phosphorus compound (BH) may be a hydroxy group.

In the multilayer structure of the present invention, in the phosphorus compound (BH), the phosphorus atom having the at least one hydroxy group may be at least one functional group selected from the group consisting of a phosphoric acid group, a phosphorous acid group, a phosphonic acid group, a phosphonous acid group, a phosphinic acid group, and a phosphinous acid group.

In the multilayer structure of the present invention, the ratio $M_{BH}/M_{BI}$ of the number of moles $M_{BH}$ of the phosphorus compound (BH) to the number of moles $M_{BI}$ of the inorganic phosphorus compound (BI) is preferably $1.0 \times 10^{-4} \leq M_{BH}/M_{BI} \leq 2.0 \times 10^{-2}$.

In the multilayer structure of the present invention, a C/Al ratio as measured by X-ray photoelectron spectroscopy (XPS) is preferably 0.1 to 15.0 between a surface of the layer (Y) and a depth of 5 nm below the surface, the surface not being in contact with the base (X).

In the multilayer structure of the present invention, the layer (Y) preferably has a water contact angle of 25° to 100°.

The multilayer structure of the present invention preferably has an oxygen transmission rate of 2.0 mL/(m²·day·atm) or less at 20° C. and 85% RH.

The multilayer structure of the present invention preferably has a moisture permeability of 2.0 g/(m²·day) or less at 40° C. and 90/0% RH.

In the multilayer structure of the present invention, the base (X) may include at least one layer selected from the group consisting of a thermoplastic resin film layer and a paper layer.

The present invention provides a coating liquid containing: an aluminum-containing compound (A); an inorganic phosphorus compound (BI); a phosphorus compound (BH) in which a phosphorus atom having at least one hydroxy group and a polar group are bonded via an alkylene chain having 3 to 20 carbon atoms or a polyoxyalkylene chain based on an alkylene having 3 to 20 carbon atoms; and a solvent.

In the coating liquid of the present invention, the ratio $M_{BH}/M_{BI}$ of the number of moles $M_{BH}$ of the phosphorus compound (BH) to the number of moles $M_{BI}$ of the inorganic phosphorus compound (BI) is preferably $1.0 \times 10^{-4} \leq M_{BH}/M_{BI} \leq 2.0 \times 10^{-2}$.

The present invention also provides a method for producing a multilayer structure including a base (X) and a layer (Y), including the steps of:

(I-1) applying a coating liquid (S1) to the base (X) to form a precursor layer of the layer (Y), the coating liquid (S1) containing an aluminum-containing compound (A), an inorganic phosphorus compound (BI), a phosphorus compound (BH), and a solvent, the phosphorus compound (BH) in which a phosphorus atom having at least one hydroxy group and a polar group are bonded via an alkylene chain having 3 to 20 carbon atoms or a polyoxyalkylene chain based on an alkylene having 3 to 20 carbon atoms; and (I-2) treating the precursor layer of the layer (Y) to form the layer (Y).

The present invention further provides a method for producing the multilayer structure including a base (X) and a layer (Y), including the steps of:

(II-1) applying a coating liquid (S2) to form a precursor layer of the layer (Y) on the base (X), the coating liquid (S2) containing an aluminum-containing compound (A), an inorganic phosphorus compound (BI), and a solvent;

(II-2) applying a coating liquid (T) to the precursor layer, the coating liquid (T) containing the phosphorus compound (BH) and a solvent; and (II-3) treating the precursor layer of the layer (Y) to form the layer (Y).

The present invention also provides a packaging material including any one of the multilayer structures as defined above.

The packaging material may further include a layer formed by extrusion coating lamination.

The packaging material may be a vertical form-fill-seal bag, a vacuum packaging bag, a pouch, a laminated tube container, an infusion bag, a paper container, a strip tape, a container lid, or an in-mold labeled container.

The present invention also provides a vacuum insulator including the vacuum packaging bag, wherein the vacuum packaging bag contains a substance in an interior thereof, the substance is a core material, and the interior of the vacuum packaging bag has a reduced pressure.

The present invention also provides a protective sheet for electronic devices, the protective sheet including any one of the multilayer structures as defined above.

The protective sheet for electronic devices may be a protective sheet for protecting a surface of a photoelectric conversion device, an information display device, or a lighting device.

The present invention also provides an electronic device including any one of the protective sheets as defined above.

Advantageous Effects of Invention

The present invention makes it possible to obtain: a novel multilayer structure having good gas barrier properties and good water vapor barrier properties and having high retort resistance; and a packaging material including the multilayer structure. That is, the present invention makes it possible to obtain: a novel multilayer structure that not only has good gas barrier properties and good water vapor barrier properties but also is capable of maintaining good gas barrier properties and good water vapor barrier properties even after retorting under harsh conditions and retains good interlayer adhesion (peel strength) without suffering from appearance defects such as delamination even after retorting under harsh conditions; and a method for producing the multilayer structure; and a coating liquid for forming the multilayer structure. The present invention also makes it possible to obtain a protective sheet for electronic devices that includes a novel multilayer structure having good gas barrier properties and good water vapor barrier properties and retaining good interlayer adhesion even at high temperature and high humidity. That is, the present invention makes it possible to obtain an electronic device including a protective sheet including a novel multilayer structure that not only has good gas barrier properties and good water vapor barrier properties but also is capable of maintaining good gas barrier properties and good water vapor barrier properties even after a damp heat test and retains good interlayer adhesion (peel strength) without suffering from appearance defects such as delamination after a damp heat test.

DESCRIPTION OF EMBODIMENTS

Figure 1:
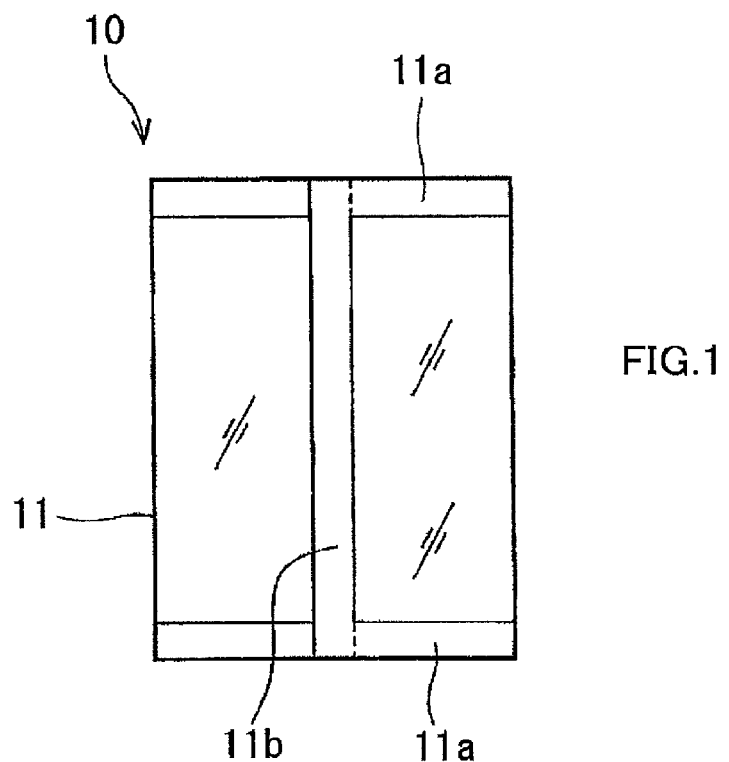
FIG. 1 is a schematic diagram of an exemplary vertical form-fill-seal bag according to an embodiment of the present invention.

Hereinafter, the present invention will be described with reference to examples. The following description gives examples of materials, conditions, techniques, and value ranges; however, the present invention is not limited to those mentioned as examples. The materials given as examples may be used alone or may be used in combination with one another, unless otherwise specified. In the present specification, the upper limits and lower limits of value ranges (ranges of, for example, the contents of components, values calculated for components, and values of physical properties) can be combined appropriately.

Unless otherwise specified, the meaning of an expression like "a particular layer is stacked on a particular member (such as a base or layer)" as used herein encompasses not only the case where the particular layer is stacked in contact with the member but also the case where the particular layer is stacked above the member, with another layer interposed therebetween. The same applies to expressions like "a particular layer is formed on a particular member (such as a base or layer)" and "a particular layer is disposed on a particular member (such as a base or layer)". Unless otherwise specified, the meaning of an expression like "a liquid (such as a coating liquid) is applied onto a particular member (such as a base or layer)" encompasses not only the case where the liquid is applied directly to the member but also the case where the liquid is applied to another layer formed on the member.

[Multilayer Structure]

The multilayer structure of the present invention includes a base (X) and a layer (Y). The layer (Y) contains an aluminum-containing compound (A) (which hereinafter may be simply referred to as "compound (A)") and a phosphorus compound (BH) (which hereinafter may be simply referred to as "compound (BH)") in which a phosphorus atom having at least one hydroxy group and a polar group are bonded via an alkylene chain having 3 to 20 carbon atoms or a polyoxyalkylene chain based on an alkylene having 3 to 20 carbon atoms. The compound (A) includes a compound (Ab) including a reaction product (D) of an aluminum-containing metal oxide (Aa) and an inorganic phosphorus compound (BI). The term "multilayer structure" as used in the following description refers to a multilayer structure including the base (X) and the layer (Y), unless otherwise specified.

[Base (X)]

The material of the base (X) is not particularly limited, and a base made of any of various materials can be used. Examples of the material of the base (X) include: resins such as thermoplastic resins and thermosetting resins; fiber assemblies such as fabrics and paper; wood; and glass. Among these, thermoplastic resins and fiber assemblies are preferred, and thermoplastic resins are more preferred. The form of the base (X) is not particularly limited. The base (X) may be a planar layer such as a film or sheet. The base (X) preferably includes at least one layer selected from the group consisting of a thermoplastic resin film layer and a paper layer, more preferably includes a thermoplastic resin film layer, and is even more preferably a thermoplastic resin film layer.

Examples of thermoplastic resins that may be used in the base (X) include: polyolefin resins such as polyethylene and polypropylene; polyester resins such as polyethylene terephthalate (PET), polyethylene-2,6-naphthalate, polybutylene terephthalate, and copolymers thereof, polyamide resins such as nylon-6, nylon-66, and nylon-12; hydroxy group-containing polymers such as polyvinyl alcohol and ethylene-vinyl alcohol copolymer; polystyrene; poly(meth)acrylic acid esters; polyacrylonitrile; polyvinyl acetate; polycarbonate; polyarylate; regenerated cellulose; polyimide; polyetherimide; polysulfone; polyethersulfone; polyetheretherketone; and ionomer resins. When the multilayer structure is used as or in a packaging material, the material of the base (X) is preferably at least one thermoplastic resin selected from the group consisting of polyethylene, polypropylene, polyethylene terephthalate, nylon-6, and nylon-66.

When a film made of such a thermoplastic resin is used as the base (X), the base (X) may be an oriented film or non-oriented film. In terms of high suitability for processes (such as printing and lamination) of the resulting multilayer structure, an oriented film, particularly a biaxially-oriented film, is preferred. The biaxially-oriented film may be a biaxially-oriented film produced by any one method selected from simultaneous biaxial stretching, sequential biaxial stretching, and tubular stretching.

Examples of paper that may be used in the base (X) include kraft paper, high-quality paper, simili paper, glassine paper, parchment paper, synthetic paper, white paperboard, manila board, milk carton board, cup paper, and ivory paper. The use of paper in the base (X) makes it possible to obtain a multilayer structure for a paper container.

When the base (X) is in the form of a planar layer, the thickness of the base (X) is preferably 1 to 1,000 µm, more preferably 5 to 500 µm, and even more preferably 9 to 200 µm, in terms of high mechanical strength and good processability of the resulting multilayer structure.

[Layer (Y)]

The multilayer structure of the present invention includes a layer (Y) containing an aluminum-containing compound (A) and a phosphorus compound (BH) in which a phosphorus atom having at least one hydroxy group and a polar group are bonded via an alkylene chain having 3 to 20 carbon atoms or a polyoxyalkylene chain based on an alkylene having 3 to 20 carbon atoms. The compound (A) is preferably a compound (Ab) including a reaction product (D) of an aluminum-containing metal oxide (Aa) and an inorganic phosphorus compound (BI). The compound (A), the phosphorus compound (BH), and the inorganic phosphorus compound (BI) will now be described.

[Aluminum-Containing Compound (A)]

The compound (A) may be the aluminum-containing metal oxide (Aa) or the compound (Ab) including the reaction product (D) formed by a reaction between the aluminum-containing metal oxide (Aa) (which hereinafter may be simply referred to as "metal oxide (Aa)") and the inorganic phosphorus compound (BI) (such a compound including the reaction product (D) may hereinafter be simply referred to as "compound (Ab)"). The aluminum-containing metal oxide (Aa) is typically in the form of particles when reacted with the inorganic phosphorus compound (BI).

[Aluminum-Containing Metal Oxide (Aa)]

The metal atoms constituting the aluminum-containing metal oxide (Aa) (the metal atoms may be collectively referred to as "metal atoms (M)") include at least one metal atom selected from atoms of metals belonging to Groups 2 to 14 of the periodic table, and include at least aluminum atoms. The metal atoms (M) may consist of aluminum atoms or may include aluminum atoms and other metal atoms. One metal oxide may be used alone as the metal oxide (Aa), or a combination of two or more metal oxides may be used as the metal oxide (Aa).

The proportion of aluminum atoms in the metal atoms (M) is typically 50 mol % or more, and may be 60 to 100 mol % or 80 to 100 mol %. Examples of the metal oxide (Aa) include metal oxides produced by methods such as liquid-phase synthesis, gas-phase synthesis, and solid grinding.

The metal oxide (Aa) may be a hydrolytic condensate of a compound (E) containing a metal atom (M) to which a hydrolyzable characteristic group is bonded. Examples of the characteristic group include $R^1$ in the general formula [I] described below. The hydrolytic condensate of the compound (E) can be regarded substantially as a metal oxide. Thus, the hydrolytic condensate of the compound (E) may be referred to as "metal oxide (Aa)" herein. That is, the term "metal oxide (Aa)" as used herein is interchangeable with the term "hydrolytic condensate of the compound (E)", while the term "hydrolytic condensate of the compound (E)" as used herein is interchangeable with the term "metal oxide (Aa)".

[Compound (E) Containing Metal Atom (M) to which Hydrolyzable Characteristic Group is Bonded]

In terms of ease of control of reaction with the inorganic phosphorus compound (BI) and in terms of good gas barrier properties of the resulting multilayer structure, the compound (E) preferably includes at least one compound (Ea) represented by the following general formula [I].

$$Al(R^1)_k(R^2)_{3-k} \quad [1]$$

In this formula, $R^1$ is a halogen atom (such as a fluorine atom, chlorine atom, bromine atom, or iodine atom), $NO_3$, an optionally substituted alkoxy group having 1 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, or a diacylmethyl group having an optionally substituted acyl group having 1 to 9 carbon atoms. $R^2$ is an optionally substituted alkyl group having 1 to 9 carbon atoms, an optionally substituted aralkyl group having 7 to 10 carbon atoms, an optionally substituted alkenyl group having 2 to 9 carbon atoms, or an optionally substituted aryl group having 6 to 10 carbon atoms. k is an integer of 1 to 3. When there are two or more atoms or groups represented by $R^1$, the atoms or groups represented by $R^1$ may be the same as or different from each other. When there are two or more groups represented by $R^2$, the groups represented by $R^2$ may be the same as or different from each other.

The compound (E) may include, in addition to the compound (Ea), at least one compound (Eb) represented by the following general formula [II].

$$M^1(R^3)_m(R^4)_{n-m} \quad [II]$$

In this formula, $M^1$ is at least one metal atom different from an aluminum atom and selected from atoms of metals belonging to Groups 2 to 14 of the periodic table. $R^3$ is a halogen atom (such as a fluorine atom, chlorine atom, bromine atom, or iodine atom), $NO_3$, an optionally substituted alkoxy group having 1 to 9 carbon atoms, an optionally substituted acyloxy group having 2 to 9 carbon atoms, an optionally substituted alkenyloxy group having 3 to 9 carbon atoms, an optionally substituted β-diketonato group having 5 to 15 carbon atoms, or a diacylmethyl group having an optionally substituted acyl group having 1 to 9 carbon atoms. $R^4$ is an optionally substituted alkyl group having 1 to 9 carbon atoms, an optionally substituted aralkyl group having 7 to 10 carbon atoms, an optionally substituted alkenyl group having 2 to 9 carbon atoms, or an optionally substituted aryl group having 6 to 10 carbon atoms. m is an integer of 1 to n. n is equal to the valence of $M^1$. When there are two or more atoms or groups represented by $R^3$, the atoms or groups represented by $R^3$ may be the same as or different from each other. When there are two or more groups represented by $R^4$, the groups represented by $R^4$ may be the same as or different from each other.

Examples of the alkoxy groups represented by $R^1$ and $R^3$ include methoxy, ethoxy, n-propoxy, isopropoxy, n-butoxy, isobutoxy, sec-butoxy, tert-butoxy, benzyloxy, diphenylmethoxy, trityloxy, 4-methoxybenzyloxy, methoxymethoxy, 1-ethoxyethoxy, benzyloxymethoxy, 2-trimethylsilylethoxy, 2-trimethylsilylethoxymethoxy, phenoxy, and 4-methoxyphenoxy groups.

Examples of the acyloxy groups represented by $R^1$ and $R^3$ include acetoxy, ethylcarbonyloxy, n-propylcarbonyloxy, isopropylcarbonyloxy, n-butylcarbonyloxy, isobutylcarbonyloxy, sec-butylcarbonyloxy, tert-butylcarbonyloxy, and n-octylcarbonyloxy groups.

Examples of the alkenyloxy groups represented by $R^1$ and $R^3$ include allyloxy, 2-propenyloxy, 2-butenyloxy, 1-methyl-2-propenyloxy, 3-butenyloxy, 2-methyl-2-propenyloxy, 2-pentenyloxy, 3-pentenyloxy, 4-pentenyloxy, 1-methyl-3-butenyloxy, 1,2-dimethyl-2-propenyloxy, 1,1-dimethyl-2-propenyloxy, 2-methyl-2-butenyloxy, 3-methyl-2-butenyloxy, 2-methyl-3-butenyloxy, 3-methyl-3-butenyloxy, 1-vinyl-2-propenyloxy, and 5-hexenyloxy groups.

Examples of the β-diketonato groups represented by $R^1$ and $R^3$ include 2,4-pentanedionato, 1,1,1-trifluoro-2,4-pentanedionato, 1,1,1,5,5,5-hexafluoro-2,4-pentanedionato, 2,2,6,6-tetramethyl-3,5-heptanedionato, 1,3-butanedionato, 2-methyl-1,3-butanedionato, 2-methyl-1,3-butanedionato, and benzoylacetonato groups.

Examples of the acyl groups of the diacylmethyl groups represented by $R^1$ and $R^3$ include: aliphatic acyl groups having 1 to 6 carbon atoms such as formyl, acetyl, propionyl (propanoyl), butyryl (butanoyl), valeryl (pentanoyl), and hexanoyl groups; and aromatic acyl (aroyl) groups such as benzoyl and toluoyl groups.

Examples of the alkyl groups represented by $R^2$ and $R^4$ include methyl, ethyl, n-propyl, isopropyl, n-butyl, isobutyl, sec-butyl, tert-butyl, n-pentyl, isopentyl, n-hexyl, isohexyl, 3-methylpentyl, 2-methylpentyl, 1,2-dimethylbutyl, cyclopropyl, cyclopentyl, and cyclohexyl groups.

Examples of the aralkyl groups represented by $R^2$ and $R^4$ include benzyl and phenylethyl (phenethyl) groups.

Examples of the alkenyl groups represented by $R^2$ and $R^4$ include vinyl, 1-propenyl, 2-propenyl, isopropenyl, 3-butenyl, 2-butenyl, 1-butenyl, 1-methyl-2-propenyl, 1-methyl-1-propenyl, 1-ethyl-1-ethenyl, 2-methyl-2-propenyl, 2-methyl-1-propenyl, 3-methyl-2-butenyl, and 4-pentenyl groups.

Examples of the aryl groups represented by $R^2$ and $R^4$ include phenyl, 1-naphthyl, and 2-naphthyl groups.

Examples of the substituents in $R^1$, $R^2$, $R^3$, and $R^4$ include: alkyl groups having 1 to 6 carbon atoms; alkoxy groups having 1 to 6 carbon atoms such as methoxy, ethoxy, n-propoxy, isopropoxy, n-butoxy, isobutoxy, sec-butoxy, tert-butoxy, n-pentyloxy, isopentyloxy, n-hexyloxy, cyclopropyloxy, cyclobutyloxy, cyclopentyloxy, and cyclohexyloxy groups; alkoxycarbonyl groups having 1 to 6 carbon atoms such as methoxycarbonyl, ethoxycarbonyl, n-propoxycarbonyl, isopropoxycarbonyl, n-butoxycarbonyl, isobutoxycarbonyl, sec-butoxycarbonyl, tert-butoxycarbonyl, n-pentyloxycarbonyl, isopentyloxycarbonyl, cyclopropyloxycarbonyl, cyclobutyloxycarbonyl, and cyclopentyloxycarbonyl groups; aromatic hydrocarbon groups such as phenyl, tolyl, and naphthyl groups; halogen atoms such as fluorine, chlorine, bromine, and iodine atoms; acyl groups having 1 to 6 carbon atoms; aralkyl groups having 7 to 10 carbon atoms; aralkyloxy groups having 7 to 10 carbon atoms; alkylamino groups having 1 to 6 carbon atoms; and dialkylamino groups having an alkyl group having 1 to 6 carbon atoms.

It is preferable for $R^1$ and $R^3$ to be a halogen atom, $NO_3$, an optionally substituted alkoxy group having 1 to 6 carbon atoms, an optionally substituted acyloxy group having 2 to 6 carbon atoms, an optionally substituted β-diketonato group having 5 to 10 carbon atoms, or a diacylmethyl group having an optionally substituted acyl group having 1 to 6 carbon atoms, and it is more preferable for W and $R^3$ to be an optionally substituted alkoxy group having 1 to 6 carbon atoms.

It is preferable for $R^2$ and $R^4$ to be an optionally substituted alkyl group having 1 to 6 carbon atoms.

It is preferable for k in the formula [I] to be 3. It is preferable for $M^1$ to be an atom of a metal belonging to Group 4 of the periodic table, and it is more preferable for $M^1$ to be titanium or zirconium. When $M^1$ is an atom of a metal belonging to Group 4 of the periodic table, m in the formula [II] is preferably 4.

Boron and silicon are categorized herein as metals, although they may be classified as semimetals in other contexts.

Examples of the compound (Ea) include aluminum chloride, aluminum nitrate, aluminum acetate, tris(2,4-pentanedionato)aluminum, trimethoxyaluminum, triethoxyaluminum, tri-n-propoxyaluminum, triisopropoxyaluminum, tri-n-butoxyaluminum, tri-sec-butoxyaluminum, and tri-tert-butoxyaluminum. Among these, triisopropoxyaluminum and tri-sec-butoxyaluminum are preferred. One compound may be used alone as the compound (Ea) or a combination of two or more compounds may be used as the compound (Ea).

Examples of the compound (Eb) include: titanium compounds such as tetrakis(2,4-pentanedionato)titanium, tetramethoxytitanium, tetraethoxytitanium, tetraisopropoxytitanium, tetra-n-butoxytitanium, and tetrakis(2-ethylhexoxy)titanium; and zirconium compounds such as tetrakis(2,4-pentanedionato)zirconium, tetra-n-propoxyzirconium, and tetra-n-butoxyzirconium. One of these compounds may be used alone, or two or more of these compounds may be used in combination.

The proportion of the compound (Ea) in the total amount of the compound (E) is not particularly limited as long as the effect of the present invention is obtained. The proportion of the compound (e.g., the compound (Eb)) other than the compound (Ea) in the total amount of the compound (E) is preferably, for example, 20 mol % or less, more preferably 10 mol % or less, and even more preferably 5 mol % or less, and may be 0 mol %.

The compound (E) is hydrolyzed, so that at least some of the hydrolyzable characteristic groups of the compound (E) are converted to hydroxy groups. The hydrolysate is then condensed to form a compound in which the metal atoms (M) are linked together via an oxygen atom (O). The repetition of this condensation results in the formation of a compound that can be regarded substantially as a metal oxide. The thus formed metal oxide (Aa), in general, has hydroxy groups present on its surface.

A compound is categorized herein as the metal oxide (Aa) when the ratio, [the number of moles of the oxygen atoms (O) bonded only to the metal atoms (M)]/[the number of moles of the metal atoms (M)], is 0.8 or more in the compound. The "oxygen atom (O) bonded only to the metal atom (M)", as defined herein, refers to the oxygen atom (O) in the structure represented by M-O-M, and does not include an oxygen atom that is bonded to both the metal atom (M) and hydrogen atom (H) as is the case for the oxygen atom (O) in the structure represented by M-O—H. The above ratio in the metal oxide (Aa) is preferably 0.9 or more, more preferably 1.0 or more, and even more preferably 1.1 or more. The upper limit of this ratio is not particularly defined. When the valence of the metal atom (M) is denoted by n, the upper limit is typically expressed as n/2.

In order for the hydrolytic condensation to take place, it is important that the compound (E) has hydrolyzable characteristic groups. When there are no such groups bonded, hydrolytic condensation reaction does not occur or proceeds very slowly, which makes difficult the preparation of the metal oxide (Aa) intended.

The hydrolytic condensate of the compound (E) may be produced, for example, from a particular starting material by a technique employed in known sol-gel processes. As the starting material there can be used at least one selected from the group consisting of the compound (E), a partial hydrolysate of the compound (E), a complete hydrolysate of the compound (E), a compound formed by partial hydrolytic condensation of the compound (E), and a compound formed by condensation of a part of a complete hydrolysate of the compound (E).

The metal oxide (Aa) to be mixed with an inorganic phosphorus compound (BI)-containing material (the inorganic phosphorus compound (BI) itself or a composition containing the inorganic phosphorus compound (BI)) is preferably substantially free of phosphorus atoms.

[Compound (Ab)]

The reaction product (D) included in the compound (Ab) is obtained by a reaction between the metal oxide (Aa) and the inorganic phosphorus compound (BI). A compound formed by a reaction among the metal oxide (Aa), the inorganic phosphorus compound (BI), and another compound is also categorized as the reaction product (D). The compound (Ab) may partially include the metal oxide (Aa) and/or inorganic phosphorus compound (BI) that remains uninvolved in any reaction.

In the compound (Ab), the molar ratio between the metal atoms constituting the metal oxide (Aa) and the phosphorus atoms derived from the inorganic phosphorus compound (BI), as expressed by [metal atoms constituting metal oxide (Aa)]=[phosphorus atoms derived from inorganic phosphorus compound (BD], is preferably 1.0:1.0 to 3.6:1.0 and more preferably 1.1:1.0 to 3.0:1.0. When the molar ratio is outside this range, the gas barrier performance is deteriorated. The molar ratio in the compound (Ab) can be controlled by adjusting the mixing ratio between the metal oxide (Aa) and the inorganic phosphorus compound (BI) in a coating liquid for forming the compound (Ab). The molar ratio in the compound (Ab) is typically equal to that in the coating liquid.

When the layer (Y) side of the multilayer structure is measured for an infrared absorption spectrum by attenuated total reflection spectroscopy using a Fourier transform infrared spectrophotometer, a maximum absorption wavenumber in the region from 800 to 1,400 $cm^{-1}$ is preferably 1,080 to 1,130 $cm^{-1}$. In the process in which the metal oxide (Aa) and the inorganic phosphorus compound (BI) react to form the reaction product (D), a metal atom (M) derived from the metal oxide (Aa) and a phosphorus atom (P) derived from the inorganic phosphorus compound (BI) are linked via an oxygen atom (O) to form a bond represented by M-O—P. As a result, a characteristic absorption band attributed to this bond appears in an infrared absorption spectrum of the reaction product (D). A study by the present inventors has revealed that the resulting multilayer structure exhibits good gas barrier properties when the characteristic absorption band attributed to the M-O—P bond is observed in the region from 1,080 to 1,130 $cm^{-1}$. It has also been found that the resulting multilayer structure exhibits much better gas barrier properties particularly when the characteristic absorption band corresponds to the strongest absorption in the region from 800 to 1,400 $cm^{-1}$ where absorptions attributed to bonds between various atoms and oxygen atoms are generally observed.

By contrast, if a metal compound such as a metal alkoxide or metal salt and the inorganic phosphorus compound (BI) are first mixed together and the mixture is then subjected to hydrolytic condensation, the resulting product is a composite material in which the metal atoms derived from the metal compound and the phosphorus atoms derived from the inorganic phosphorus compound (BI) have been almost homogeneously mixed and reacted. In this case, in an infrared absorption spectrum of the composite material, the maximum absorption wavenumber in the region from 800 to 1,400 cm$^{-1}$ falls outside the range of 1,080 to 1,130 cm$^{-1}$.

When the layer (Y) side of the multilayer structure is measured for an infrared absorption spectrum by attenuated total reflection spectroscopy using a Fourier transform infrared spectrophotometer, the width at half maximum of the maximum absorption band in the region from 800 to 1,400 cm$^{-1}$ is preferably 200 cm$^{-1}$ or less, more preferably 150 cm$^{-1}$ or less, even more preferably 100 cm$^{-1}$ or less, and particularly preferably 50 cm$^{-1}$ or less, in terms of the gas barrier properties of the resulting multilayer structure.

To obtain high barrier performance, an infrared absorption spectrum as measured for the layer (Y) alone preferably meets the value conditions as described above for the infrared absorption spectrum of the multilayer structure. The infrared absorption spectrum of the multilayer structure can be measured by the method described in "EXAMPLES" below. If the measurement is not possible by the method described in "EXAMPLES", the measurement may be conducted by another method, examples of which include, but are not limited to: reflection spectroscopy such as reflection absorption spectroscopy, external reflection spectroscopy, or attenuated total reflection spectroscopy; and transmission spectroscopy such as Nujol method or pellet method performed on the layer (Y) scraped from the multilayer structure.

[Inorganic Phosphorus Compound (BI)]

The inorganic phosphorus compound (BI) has a moiety capable of reacting with the metal oxide (Aa) and typically has a plurality of such moieties. It is preferable for the inorganic phosphorus compound (BI) to be a compound having 2 to 20 such moieties (atomic groups or functional groups). Examples of such moieties include a moiety capable of undergoing a condensation reaction with a functional group (e.g., hydroxy group) present on the surface of the metal oxide (Aa). Examples of such a moiety include a halogen atom bonded directly to a phosphorus atom and an oxygen atom bonded directly to a phosphorus atom. In general, the functional group (e.g., hydroxy group) present on the surface of the metal oxide (Aa) is bonded to the metal atom (M) constituting the metal oxide (Aa).

Examples of the inorganic phosphorus compound (BI) include: phosphorus oxoacids such as phosphoric acid, diphosphoric acid, triphosphoric acid, polyphosphoric acid formed by condensation of 4 or more molecules of phosphoric acid, phosphorous acid, phosphonic acid, phosphonous acid, phosphinic acid, and phosphinous acid; salts of these oxoacids (e.g., sodium phosphate); and derivatives of these oxoacids (e.g., halides such as phosphoryl chloride and dehydration products such as phosphorus pentoxide).

These inorganic phosphorus compounds (BI) may be used alone or in combination with one another. Among these inorganic phosphorus compounds (BI), phosphoric acid is preferably used alone or in combination with another inorganic phosphorus compound (BI). The use of phosphoric acid improves the stability of the coating liquid (S) described later and the gas barrier properties of the resulting multilayer structure. When phosphoric acid is used in combination with another inorganic phosphorus compound (BI), phosphoric acid preferably makes up 50 mol % or more of the total inorganic phosphorus compounds (BI).

[Phosphorus Compound (BH)]

The multilayer structure of the present invention includes the phosphorus compound (BH) in the layer (Y). In the phosphorus compound (BH), a phosphorus atom having at least one hydroxy group and a polar group are bonded via an alkylene chain having 3 to 20 carbon atoms or a polyoxyalkylene chain based on an alkylene having 3 to 20 carbon atoms. The phosphorus compound (BH) has lower surface free energy than the metal oxide (Aa), the inorganic phosphorus compound (BI), and the reaction product (D) and, in the process of formation of a precursor of the layer (Y), segregates to the surface of the precursor. The phosphorus compound (BH) has: the phosphorus atom having the at least one hydroxy group capable of reacting with the components contained in the layer (Y); and the polar group capable of reacting with another member (e.g., an adhesive layer (I) or additional layer (J) such as an ink layer). Therefore, the cohesion of the multilayer structure is enhanced so that the interlayer adhesion can be maintained even after retorting. This makes it possible to prevent appearance defects such as delamination.

The phosphorus compound (BH) is represented by, for example, the following formula.

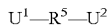

[III]

In this formula, U$^1$ includes a phosphorus atom having at least one hydroxy group, R$^5$ is a linear or branched alkylene group having 3 to 20 carbon atoms or a polyoxyalkylene group based on a linear or branched alkylene having 3 to 20 carbon atoms, and U$^2$ is a polar group. The linear or branched alkylene group represented by R$^5$ in the formula [III], or the linear or branched alkylene group on which the polyoxyalkylene group represented by R$^5$ in the formula [III] is based, preferably has 3 to 20 carbon atoms, more preferably 4 to 18 carbon atoms, and even more preferably 6 to 14 carbon atoms in order to ensure that the phosphorus compound (BH) has lower surface energy than the other components of the layer (Y) and is readily soluble in a solvent used.

Examples of the phosphorus atom (which is represented by U$^1$ in the formula [III]) having the at least one hydroxy group include a phosphoric acid group, a phosphorous acid group, a phosphonic acid group, a phosphonous acid group, a phosphinic acid group, and a phosphinous acid group. Among these, a phosphoric acid group and a phosphonic acid group are preferred, and a phosphonic acid group is more preferred. The polar group can react with another member, such as an ink layer or adhesive layer (I), contiguous to the layer (Y). Examples of the polar group include a hydroxy group, a carboxy group, and an amino group. Among these, a hydroxy group and a carboxy group are preferred, and a hydroxy group is particularly preferred.

Specific examples of the phosphorus compound (BH) include 3-hydroxypropylphosphonic acid, 4-hydroxybutylphosphonic acid, 5-hydroxypentylphosphonic acid, 6-hydroxyhexylphosphonic acid, 7-hydroxyheptylphosphonic acid, 8-hydroxyoctylphosphonic acid, 9-hydroxynonylphosphonic acid, 10-hydroxydecylphosphonic acid, 11-hydroxyundecylphosphonic acid, 12-hydroxydodecylphosphonic acid, 13-hydroxytridecylphosphonic acid, 14-hydroxytetradecylphosphonic acid, 15-hydroxypentadecylphosphonic acid, 16-hydroxyhexadecylphosphonic acid, 17-hydroxyheptadecylphosphonic acid, 18-hydroxyoctadecylphosphonic acid, 19-hydroxynonadecylphosphonic acid, 20-hydroxyicosylphosphonic acid, 3-hydroxypropyl dihydrogen phosphate, 4-hydroxybutyl dihydrogen phosphate, 5-hydroxypentyl dihydrogen phosphate, 6-hydroxyhexyl dihydrogen phosphate, 7-hydroxyheptyl dihydrogen phosphate, 8-hydroxyoctyl dihydrogen phosphate, 9-hydroxynonyl dihydrogen phosphate, 10-hydroxydecyl dihydrogen phosphate, 11-hydroxyundecyl dihydrogen phosphate, 12-hydroxydodecyl dihydrogen phosphate, 13-hydroxytridecyl dihydrogen phosphate, 14-hydroxytetradecyl dihydrogen phosphate, 15-hydroxypentadecyl dihydrogen phosphate, 16-hydroxyhexadecyl dihydrogen phosphate, 17-hydroxyheptadecyl dihydrogen phosphate, 18-hydroxyoctadecyl dihydrogen phosphate, 19-hydroxynonadecyl dihydrogen phosphate, 20-hydroxyicosyl dihydrogen phosphate, 3-carboxypropylphosphonic acid, 4-carboxybutylphosphonic acid, 5-carboxypentylphosphonic acid, 6-carboxyhexylphosphonic acid, 7-carboxyheptylphosphonic acid, 8-carboxyoctylphosphonic acid, 9-carboxynonylphosphonic acid, 10-carboxydecylphosphonic acid, 11-carboxyundecylphosphonic acid, 12-carboxydodecylphosphonic acid, 13-carboxytridecylphosphonic acid, 14-carboxytetradecylphosphonic acid, 15-carboxypentadecylphosphonic acid, 16-carboxyhexadecylphosphonic acid, 17-carboxyheptadecylphosphonic acid, 18-carboxyoctadecylphosphonic acid, 19-carboxynonadecylphosphonic acid, and 20-carboxyicosylphosphonic acid. These may be used alone or in combination with one another.

The layer (Y) included in the multilayer structure of the present invention may consist of: the aluminum-containing compound (A), the inorganic phosphorus compound (BI), and the phosphorus compound (BH); the aluminum-containing metal oxide (Aa), the inorganic phosphorus compound (BI), and the phosphorus compound (BH); the compound (Ab) including the reaction product (D) of the aluminum-containing metal oxide (Aa) and the inorganic phosphorus compound (BI), the inorganic phosphorus compound (BI), and the phosphorus compound (BH); or the aluminum-containing metal oxide (Aa), the compound (Ab) including the reaction product (D) of the aluminum-containing metal oxide (Aa) and the inorganic phosphorus compound (BI), the inorganic phosphorus compound (BI), and the phosphorus compound (BH). In any of the above case, the layer (Y) may further contain an additional component. Examples of the additional component that may be contained in the layer (Y) include: metal salts of inorganic acids such as a metal carbonate, a metal hydrochloride, a metal nitrate, a metal hydrogen carbonate, a metal sulfate, a metal hydrogen sulfate, and a metal borate; metal salts of organic acids such as a metal oxalate, a metal acetate, a metal tartrate, and a metal stearate; metal complexes such as a cyclopentadienyl metal complex (e.g., titanocene) and a cyanometal complex (e.g., Prussian blue); layered clay compounds; crosslinkers; polymer compounds; plasticizers; antioxidants; ultraviolet absorbers; and flame retardants. The content of the additional component in the layer (Y) of the multilayer structure is preferably 50 mass % or less, more preferably 20 mass % or less, even more preferably 10 mass % or less, and particularly preferably 5 mass % or less, and may be 0 mass % (which means that the additional component is not contained).

In the layer (Y) of the multilayer structure, the ratio $M_{BH}/M_{BI}$ of the number of moles $M_{BH}$ of the phosphorus compound (BH) to the number of moles $M_{BI}$ of the inorganic phosphorus compound (BI) preferably satisfies a relationship of $1.0\times10^{-4} \leq M_{BH}/M_{BI} \leq 2.0\times10^{-2}$, more preferably satisfies a relationship of $3.5\times10^{-4} \leq M_{BH}/M_{BI} \leq 1.0\times10^{-2}$ in terms of better cohesion, and particularly preferably satisfies a relationship of $5.0\times10^{-4} \leq M_{BH}/M_{BI} \leq 6.0\times10^{-3}$ in terms of better cohesion and better barrier performance. The number of moles $M_{BI}$ of the inorganic phosphorus compound (BI) in $M_{BH}/M_{BI}$ refers to the number of moles of the inorganic phosphorus compound (BI) involved in formation of the reaction product (D).

A C/Al ratio as measured by X-ray photoelectron spectroscopy (XPS) is preferably 0.1 to 15.0, more preferably 0.3 to 10.0, and particularly preferably 0.5 to 5.0 between a surface of the layer (Y) of the multilayer structure and a depth of 5 nm below the surface, the surface not being in contact with the base (X). When the ratio is in this range and the phosphorus compound (BH) is present in a surface portion of the layer (Y), better cohesion can be exhibited. The C/Al ratio can be determined using the measurement method and conditions employed in the composition analysis described in "EXAMPLES" below.

The layer (Y) of the multilayer structure preferably has a water contact angle of 25° to 100°, more preferably 40° to 85°, particularly preferably 55° to 70° in terms of good cohesion. When the phosphorus compound (BH) is present in a surface portion of the layer (Y), the layer (Y) has a water contact angle in this range and good cohesion can be exhibited. The method and conditions of measurement of the water contact angle are as described in "EXAMPLES" below.

[Inorganic Deposited Layer]

The multilayer structure may further include an inorganic deposited layer. The inorganic deposited layer can be formed by vapor deposition of an inorganic substance. Examples of the inorganic substance include metals (such as aluminum), metal oxides (such as silicon oxide and aluminum oxide), metal nitrides (such as silicon nitride), metal oxynitrides (such as silicon oxynitride), and metal carbonitrides (such as silicon carbonitride). Among these, aluminum, aluminum oxide, silicon oxide, magnesium oxide, and silicon nitride are preferred, since an inorganic deposited layer formed of any of these substances has good barrier properties against oxygen or water vapor. The layer (Y) in the multilayer structure of the present invention may include an inorganic deposited layer containing aluminum. For example, the layer (Y) may include a deposited layer (Ac) of aluminum and/or a deposited layer (Ad) of aluminum oxide.

The method for forming the inorganic deposited layer is not particularly limited, and available methods include: physical vapor deposition processes such as vacuum vapor deposition (e.g., resistive heating vapor deposition, electron beam vapor deposition, and molecular beam epitaxy), ion plating, and sputtering (e.g., dual magnetron sputtering); and chemical vapor deposition processes such as thermal chemical vapor deposition (e.g., catalytic chemical vapor deposition), photochemical vapor deposition, plasma chemical vapor deposition (e.g., capacitively coupled plasma process, inductively coupled plasma process, surface wave plasma process, and electron cyclotron resonance plasma process), atomic layer deposition, and organometallic vapor deposition.

The thickness of the inorganic deposited layer is preferably 0.002 to 0.5 µm, more preferably 0.005 to 0.2 µm, and even more preferably 0.01 to 0.1 µm, although the preferred thickness depends on the type of the component of the inorganic deposited layer. A thickness at which good barrier properties and good mechanical properties of the multilayer structure are achieved can be selected within the above range. If the thickness of the inorganic deposited layer is less than 0.002 µm, the inorganic deposited layer tends to have a low ability to repeatedly exhibit the barrier properties against oxygen and water vapor, and the inorganic deposited layer may fail to exhibit sufficient barrier properties. If the thickness of the inorganic deposited layer is more than 0.5 µm, the barrier properties of the inorganic deposited layer are likely to deteriorate when the multilayer structure is pulled or bent.

The thickness of the layer (Y) (or, for a multilayer structure including two or more layers (Y), the total thickness of the layers (Y)) is preferably 0.05 µm to 4.0 µm and more preferably 0.1 µm to 2.0 µm. Thinning the layer (Y) provides a reduction in the dimensional change of the multilayer structure during a process such as printing or lamination. The thickness of the layer (Y) can be measured by observing a cross-section of the multilayer structure with a scanning electron microscope or transmission electron microscope.

[Method for Producing Multilayer Structure]

The features described for the multilayer structure of the present invention can be applied to the production method of the present invention and may not be described repeatedly. The features described for the production method of the present invention can be applied to the multilayer structure of the present invention.

Examples of the method for producing the multilayer structure of the present invention include a method including the steps of: (I-1) applying a coating liquid (S1) to the base (X) to form a precursor layer of the layer (Y) on the base (X), the coating liquid (S1) containing the aluminum-containing compound (A), the phosphorus compound (BH), and a solvent; and (I-2) treating the precursor layer of the layer (Y) to form the layer (Y), and a method including the steps of: (II-1) applying a coating liquid (S2) to the base (X) to form a precursor layer of the layer (Y), the coating liquid (S2) containing the aluminum-containing compound (A), the inorganic phosphorus compound (BI), and a solvent; (II-2) applying a coating liquid (T) to the precursor layer, the coating liquid (T) containing the phosphorus compound (BH); and (II-3) treating the precursor layer of the layer (Y) to form the layer (Y). The compound (A), the inorganic phosphorus compound (BI), the phosphorus compound (BH), and the mass ratio between them are as previously described, and will not be repeatedly described for the production method.

It suffices for a coating liquid used in the above production method for forming a gas barrier layer (the layer (Y)) to contain: the aluminum-containing compound (A); the inorganic phosphorus compound (BI); the phosphorus compound (BH) in which a phosphorus atom having at least one hydroxy group and a polar group are bonded via an alkylene chain having 3 to 20 carbon atoms or a polyoxyalkylene chain based on an alkylene having 3 to 20 carbon atoms; and a solvent. Such a gas barrier layer-forming coating liquid may be, for example, the coating liquid (S1) containing the aluminum-containing compound (A), the inorganic phosphorus compound (BI), the phosphorus compound (BH), and a solvent. The gas barrier layer-forming coating liquid may be, for example, a combination (e.g., a kit) of the coating liquid (S2) containing the aluminum-containing compound (A), the inorganic phosphorus compound (BI), and a solvent and the coating liquid (T) containing the phosphorus compound (BH) and a solvent. The suitable range of $M_{BH}/M_{BI}$ in the coating liquid is as described for the layer (Y).

[Step (I-1)]

In the step (I-1), the coating liquid (S1) containing the aluminum-containing compound (A) and the phosphorus compound (BH) is applied onto the base (X) to form a precursor layer of the layer (Y) on the base (X). The step (I-1) results in a structure including the base (X) and the precursor layer of the layer (Y).

In a preferred embodiment, the coating liquid (S1) (first coating liquid) is obtained by mixing the metal oxide (Aa), the phosphorus compound (BH), and the inorganic phosphorus compound (BI) in a solvent to cause a reaction. Specifically, the coating liquid (S1) can be prepared, for example, by a method in which the inorganic phosphorus compound (BI) and the phosphorus compound (BH) are sequentially added to and mixed with a dispersion of the metal oxide (Aa) or by a method in which a liquid mixture of the inorganic phosphorus compound (BI) and phosphorus compound (BH) is added to and mixed with a dispersion of the metal oxide (Aa). The temperature during the mixing is preferably 50° C. or lower, more preferably 30° C. or lower, and even more preferably 20° C. or lower. The coating liquid (S1) may contain another compound, examples of which include: metal salts of inorganic acids such as a metal carbonate, a metal hydrochloride, a metal nitrate, a metal hydrogen carbonate, a metal sulfate, a metal hydrogen sulfate, and a metal borate; metal salts of organic acids such as a metal oxalate, a metal acetate, a metal tartrate, and a metal stearate; metal complexes such as a cyclopentadienyl metal complex (e.g., titanocene) and a cyanometal complex (e.g., Prussian blue); layered clay compounds; crosslinkers; polymer compounds; plasticizers; antioxidants; ultraviolet absorbers; and flame retardants. The coating liquid (S1) may, if desired, contain at least one acid compound (Q) selected from the group consisting of acetic acid, hydrochloric acid, nitric acid, trifluoroacetic acid, and trichloroacetic acid.

The dispersion of the metal oxide (Aa) can be prepared, for example, by mixing the compound (E), water, and optionally an acid catalyst or organic solvent and allowing the compound (E) to undergo condensation or hydrolytic condensation according to procedures employed in known sol-gel processes. When the dispersion of the metal oxide (Aa) is obtained by condensation or hydrolytic condensation of the compound (E), the dispersion obtained may, if desired, be subjected to a certain process (such as deflocculation in the presence of the acid compound (Q)). The solvent used is preferably, but not particularly limited to, an alcohol such as methanol, ethanol, or isopropanol, water, or a mixed solvent thereof.

The solution containing the phosphorus compound (BH) can be prepared by dissolving the phosphorus compound (BH) in a solvent. The solvent may be selected as appropriate depending on the type of the phosphorus compound (BH), and may contain water or an organic solvent (e.g., an alcohol such as methanol) as long as dissolution of the phosphorus compound (BH) is not hindered.

The solution containing the inorganic phosphorus compound (BI) can be prepared by dissolving the phosphorus compound (BI) in a solvent. The solvent may be selected as appropriate depending on the type of the inorganic phosphorus compound (BI), and preferably contains water. The solvent may contain an organic solvent (e.g., an alcohol such as methanol) as long as dissolution of the inorganic phosphorus compound (BI) is not hindered.

The solids concentration in the coating liquid (S1) is preferably 1 to 20 mass %, more preferably 2 to 15 mass %, and even more preferably 3 to 10 mass %, in terms of the storage stability of the coating liquid and the quality of application of the coating liquid onto the base (X). The solids concentration can be determined, for example, by distilling off the solvent from the coating liquid (S1) and dividing the mass of the remaining solids by the initial mass of the coating liquid (S1) yet to be subjected to the distillation.

The viscosity of the coating liquid (S1) is preferably 3,000 mPa·s or less, more preferably 2,500 mPa·s or less, and even more preferably 2,000 mPa·s or less, as measured with a Brookfield rotary viscometer (SB-type viscometer: rotor No. 3, rotational speed=60 rpm) at a temperature at which the coating liquid (S1) is applied. Controlling the viscosity to 3,000 mPa·s or less improves the leveling of the coating liquid (S1), thus allowing the resulting multilayer structure to have better appearance. The viscosity of the coating liquid (S1) is preferably 50 mPa·s or more, more preferably 100 mPa·s or more, and even more preferably 200 mPa·s or more.

The molar ratio between aluminum atoms and phosphorus atoms in the coating liquid (S1), as expressed by [aluminum atoms]:[phosphorus atoms], is preferably, but not particularly limited to, 1.0:1.0 to 3.6:1.0, more preferably 1.1:1.0 to 3.0:1.0, and particularly preferably 1.11:1.00 to 1.50:1.00. The molar ratio between aluminum atoms and phosphorus atoms can be determined by fluorescent X-ray analysis of a solid obtained by drying the coating liquid (S1).

The coating liquid (S1) may be applied directly onto at least one surface of the base (X) or applied to the base (X) with an additional layer (J) interposed therebetween. An adhesive layer (I) may be formed on a surface of the base (X) by treating the surface of the base (X) with a known anchor coating agent or applying a known adhesive onto the surface of the base (X) before application of the coating liquid (S1).

The method for application of the coating liquid (S1) is not particularly limited, and any known method can be employed. Examples of the method for application include casting, dipping, roll coating, gravure coating, screen printing, reverse coating, spray coating, kiss coating, die coating, metering bar coating, chamber doctor-using coating, curtain coating, and bar coating.

In the step (I-1), the precursor layer of the layer (Y) is formed typically by removing the solvent from the coating liquid (S1). The method for removing the solvent is not particularly limited, and any known drying method can be employed. Examples of the drying method include hot air drying, hot roll contact drying, infrared heating, and microwave heating. The drying temperature is preferably equal to or lower than the onset temperature of fluidization of the base (X). The temperature employed for drying the applied coating liquid (S1) may be, for example, around 80 to 180° C. or around 90 to 150° C. The drying time is preferably, but not particularly limited to, 0.1 seconds to 1 hour, more preferably 1 second to 15 minutes, and even more preferably 5 to 300 seconds, for example.

[Step (I-2)]

In the step (I-2), the precursor layer formed in the step (I-1) is heat-treated at a temperature of 140° C. or higher to form the layer (Y). The heat treatment temperature is preferably higher than the temperature employed for drying the applied coating liquid (S1).

In the step (I-2), a reaction takes place in which particles of the metal oxide (Aa) are bonded together via phosphorus atoms (phosphorus atoms derived from the inorganic phosphorus compound (BI)). From another standpoint, a reaction of formation of the reaction product (D) takes place in the step (I-2). To allow the reaction to take place to a sufficient extent, the heat treatment temperature is preferably 140° C. or higher, more preferably 170° C. or higher, even more preferably 180° C. or higher, and particularly preferably 190° C. or higher. A lowered heat treatment temperature increases the time required to achieve a sufficient reaction rate, thereby causing a reduction in production efficiency. The preferred upper limit of the heat treatment temperature depends on, for example, the type of the base (X). For example, when a thermoplastic resin film made of a polyamide resin is used as the base (X), the heat treatment temperature is preferably 270° C. or lower. When a thermoplastic resin film made of a polyester resin is used as the base (X), the heat treatment temperature is preferably 240° C. or lower. The heat treatment may be carried out, for example, in an air atmosphere, nitrogen atmosphere, or argon atmosphere. The heat treatment time is preferably 0.1 seconds to 1 hour, more preferably 1 second to 15 minutes, and even more preferably 5 to 300 seconds.

[Step (II-1)]

In the step (II-1), the coating liquid (S2) containing the aluminum-containing compound (A) is applied onto the base (X) to form a precursor layer of the layer (Y) on the base (X). The step (II-1) results in a structure including the base (X) and the precursor layer of the layer (Y).

In a preferred embodiment, the coating liquid (S2) (first coating liquid) can be obtained by mixing the metal oxide (Aa) and inorganic phosphorus compound (BI) in a solvent to cause a reaction. Specifically, the coating liquid (S2) can be prepared, for example, by a method in which a dispersion of the metal oxide (Aa) and a solution of the inorganic phosphorus compound (BI) are mixed or by a method in which the inorganic phosphorus compound (BI) is added to and mixed with a dispersion of the metal oxide (Aa). The temperature during the mixing is preferably 50° C. or lower, more preferably 30° C. or lower, and even more preferably 20° C. or lower. The coating liquid (S2) may contain another compound, examples of which include: metal salts of inorganic acids such as a metal carbonate, a metal hydrochloride, a metal nitrate, a metal hydrogen carbonate, a metal sulfate, a metal hydrogen sulfate, and a metal borate; metal salts of organic acids such as a metal oxalate, a metal acetate, a metal tartrate, and a metal stearate; metal complexes such as a cyclopentadienyl metal complex (e.g., titanocene) and a cyanometal complex (e.g., Prussian blue); layered clay compounds; crosslinkers; polymer compounds; plasticizers; antioxidants; ultraviolet absorbers; and flame retardants. The coating liquid (S2) may, if desired, contain at least one acid compound (Q) selected from the group consisting of acetic acid, hydrochloric acid, nitric acid, trifluoroacetic acid, and trichloroacetic acid.

Methods for preparing the dispersion of the metal oxide (Aa) and the solution containing the inorganic phosphorus compound (BI) are as described for the step (I-1).

The solids concentration in the coating liquid (S2) is preferably 1 to 20 mass %, more preferably 2 to 15 mass %, and even more preferably 3 to 10 mass %, in terms of the storage stability of the coating liquid and the quality of application of the coating liquid onto the base (X). The solids concentration can be determined, for example, by distilling off the solvent from the coating liquid (S) and dividing the mass of the remaining solids by the initial mass of the coating liquid (S) yet to be subjected to the distillation.

The viscosity of the coating liquid (S2) is preferably 3,000 mPa·s or less, more preferably 2,500 mPa·s or less, and even more preferably 2,000 mPa·s or less, as measured with a Brookfield rotary viscometer (SB-type viscometer: rotor No. 3, rotational speed=60 rpm) at a temperature at which the coating liquid (S2) is applied. Controlling the viscosity to 3,000 mPa·s or less improves the leveling of the coating liquid (S), thus allowing the resulting multilayer structure to have better appearance. The viscosity of the coating liquid (S) is preferably 50 mPa·s or more, more preferably 100 mPa·s or more, and even more preferably 200 mPa·s or more.

The molar ratio between aluminum atoms and phosphorus atoms in the coating liquid (S2), as expressed by [aluminum atoms]:[phosphorus atoms], is preferably, but not particularly limited to, 1.0:1.0 to 3.6:1.0, more preferably 1.1:1.0 to 3.0:1.0, and particularly preferably 1.11:1.00 to 1.50:1.00. The molar ratio between aluminum atoms and phosphorus atoms can be determined by fluorescent X-ray analysis of a solid obtained by drying the coating liquid (S).

The coating liquid (S2) may be applied directly onto at least one surface of the base (X) or applied onto the base (X) with an additional layer interposed therebetween. An adhesive layer (I) may be formed on a surface of the base (X) by treating the surface of the base (X) with a known anchor coating agent or applying a known adhesive onto the surface of the base (X) before application of the coating liquid (S2).

The method for application of the coating liquid (S2) is not particularly limited, and any known method can be employed. Examples of the method for application are the same as those mentioned as examples of the method for application of the coating liquid (S1).

In the step (II-1), the precursor layer of the layer (Y) is formed typically by removing the solvent from the coating liquid (S2). The method for removing the solvent is not particularly limited, and any known drying method can be employed. Examples of the drying method include hot air drying, hot roll contact drying, infrared heating, and microwave heating. The drying temperature is preferably equal to or lower than the onset temperature of fluidization of the base (X). The temperature employed for drying the applied coating liquid (S2) may be, for example, around 80 to 180° C. or around 90 to 150° C. The drying time is preferably, but not particularly limited to, 0.1 seconds to 1 hour, more preferably 1 second to 15 minutes, and even more preferably 5 to 300 seconds, for example. The drying is preferably followed by heat treatment. The heat treatment temperature may be, for example, around 100 to 200° C. or around 120 to 180° C., and is preferably higher than the drying temperature. The heat treatment time is preferably, but not particularly limited to, 1 second to 1 hour, more preferably 1 second to 15 minutes, and even more preferably 5 to 300 seconds, for example. Such heat treatment prior to application of the coating liquid (T) containing the phosphorus compound (BH) is preferred to obtain a multilayer structure having good properties.

[Step (II-2)]

In the step (II-2), the coating liquid (T) (second coating liquid) containing the phosphorus compound (BH) is applied onto the precursor layer of the layer (Y) which has been obtained in the step (II-1). The coating liquid (T) can be prepared by dissolving the phosphorus compound (BH) in a solvent. The solvent used can be selected as appropriate depending on the type of the phosphorus compound (BH) and is preferably, but not particularly limited to, an alcohol such as methanol, ethanol, or isopropanol, water, or a mixed solvent thereof.

The solids concentration in the coating liquid (T) is preferably 0.01 to 60 mass %, more preferably 0.1 to 50 mass %, and even more preferably 0.2 to 40 mass %, in terms of the storage stability and the quality of application of the liquid. The solids concentration can be determined by the same method as described for the coating liquid (S2). The coating liquid (S2) may contain another component (e.g., the phosphorus compound (BH)) as long as the effect of the present invention is obtained.

The application of the coating liquid (T) is followed by removal of the solvent, resulting in the formation of a precursor layer of the layer (Y). As is the case for application of the coating liquid (S2), the method for applying the coating liquid (T) is not particularly limited, and any known method can be employed. When the phosphorus compound (BH) is used, it is particularly preferable, in terms of high retort resistance, in particular good cohesion, to adjust the amount of the coating liquid (T) to be applied so that the ratio $M_{BH}/M_{BI}$ of the number of moles $M_{BH}$ of the phosphorus compound (BH) to the number of moles $M_{BI}$ of the inorganic phosphorus compound (BI) satisfies the predetermined relationship described above.

The method for removing the solvent from the coating liquid (T) is not particularly limited, and any known drying method can be employed. Examples of the drying method include hot air drying, hot roll contact drying, infrared heating, and microwave heating. The drying temperature is preferably equal to or lower than the onset temperature of fluidization of the base (X). The temperature employed for drying the applied coating liquid (T) may be, for example, around 90 to 240° C., and is preferably 100 to 200° C.

[Step (II-3)]

In the step (II-3), the precursor layers formed in the steps (II-1) and (II-2) are heat-treated at a temperature of 140° C. or higher to form the layer (Y). The heat treatment temperature is preferably higher than the temperature employed for drying the applied coating liquid (T).

In the step (II-3), a reaction takes place in which particles of the metal oxide (Aa) are bonded together via phosphorus atoms (phosphorus atoms derived from the inorganic phosphorus compound (BI)). From another standpoint, a reaction of formation of the reaction product (D) takes place in the step (II-3). To allow the reaction to take place to a sufficient extent, the heat treatment temperature is 140° C. or higher, preferably 170° C. or higher, more preferably 180° C. or higher, and even more preferably 190° C. or higher. The upper limit of the heat treatment temperature is preferably, but not particularly limited to, 300° C. or lower. A lowered heat treatment temperature increases the time required to achieve a sufficient reaction rate, thereby causing a reduction in production efficiency. The preferred upper limit of the heat treatment temperature depends on, for example, the type of the base (X). For example, when a thermoplastic resin film made of a polyamide resin is used as the base (X), the heat treatment temperature is preferably 270° C. or lower. When a thermoplastic resin film made of a polyester resin is used as the base (X), the heat treatment temperature is preferably 240° C. or lower. The heat treatment may be carried out, for example, in an air atmosphere, nitrogen atmosphere, or argon atmosphere. The heat treatment time is preferably 0.1 seconds to 1 hour, more preferably 1 second to 15 minutes, and even more preferably 5 to 300 seconds.

In a preferred embodiment of the method for producing a multilayer structure of the present invention, the application of the coating liquid (S2) is followed by drying (first drying) and then by heat treatment (first heat treatment) to form a precursor layer, and the application of the coating liquid (T) is followed by drying (second drying) and then by heat treatment (second heat treatment). It is preferable that the temperature of the first heat treatment be higher than the temperature of the first drying, the temperature of the second heat treatment be higher than the temperature of the second drying, and the temperature of the second heat treatment be higher than the temperature of the first heat treatment.

In the multilayer structure of the present invention, it suffices for the layer (Y) to be stacked on the base (X). The layer (Y) may be stacked on the base (X) to have direct contact with the base (X). Alternatively, the layer (Y) may be stacked on the base (X), with another member (e.g., an adhesive layer (I) or additional layer (J)) interposed therebetween.

[Extrusion Coating Lamination]

The multilayer structure of the present invention can further include a layer formed by extrusion coating lamination; for example, after the layer (Y) is stacked on the base (X) directly or with the adhesive layer (I) interposed therebetween, the additional layer (J) may be formed by extrusion coating lamination on the layer (Y) directly or with the adhesive layer (I) interposed therebetween. The extrusion coating lamination method that may be used in the present invention is not particularly limited, and any known method can be used. In a typical method for extrusion coating lamination, a molten thermoplastic resin is fed to a T-die, and the thermoplastic resin is extruded through a flat slit of the T-die and then cooled to produce a laminated film.

Figure 5:
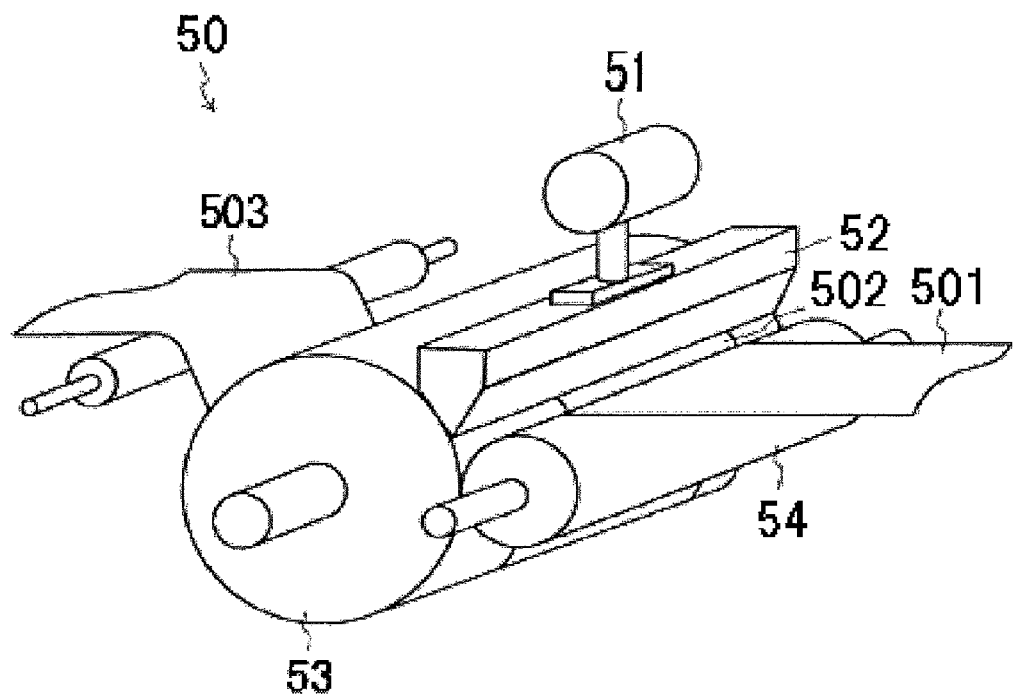
FIG. 5 is a perspective view schematically showing a part of an extrusion coating lamination apparatus used for producing a multilayer structure according to an embodiment of the present invention.

An example of single lamination, which is the most common method for extrusion coating lamination, will now be described with reference to the drawings. An exemplary apparatus used in single lamination is shown in FIG. 5. FIG. 5 schematically shows only a key part of the apparatus, and actual apparatuses are different from that shown in FIG. 5. The apparatus 50 of FIG. 5 includes an extruder 51, a T-die 52, a cooling roll 53, and a rubber roll 54. The cooling roll 53 and the rubber roll 54 are arranged in such a manner that their roll surfaces are in contact with each other.

A thermoplastic resin is heated and melted in the extruder, and then extruded through the flat slit of the T-die 52 into a resin film 502. Meanwhile, a layered product 501 is delivered from a sheet feeder (not shown) and is pressed, together with the resin film 502, between the cooling roll 53 and the rubber roll 54. The layered product 501 and the resin film 502, stacked on each other, are pressed together between the cooling roll 53 and the rubber roll 54 to produce a laminated film (multilayer structure) 503 including the layered product 501 and the resin film 502 united together.

Examples of the method for extrusion coating lamination other than the above single lamination include sandwich lamination and tandem lamination. The sandwich lamination is a method for producing a layered product by extruding a molten thermoplastic resin onto a first base supplied from an unwinder (feed roll) and bonding the extruded thermoplastic rein to a second base supplied from another unwinder. The tandem lamination is a method for producing a layered product consisting of five layers at a time by using two single-lamination machines connected together.

The use of the layered product described above allows production of a multilayer structure that maintains high barrier performance and experiences little decrease in light transmittance even after extrusion coating lamination.

[Adhesive Layer (I)]

In the multilayer structure of the present invention, the adhesion between the base (X) and the layer (Y) can be enhanced by means of the adhesive layer (I). The adhesive layer (I) may be made of an adhesive resin. The adhesive layer (I) made of an adhesive resin can be formed by treating a surface of the base (X) with a known anchor coating agent or applying a known adhesive to the surface of the base (X). The adhesive is preferably a two-component reactive polyurethane adhesive including a polyisocyanate component and a polyol component which are to be mixed and reacted. Addition of a small amount of an additive such as a known silane coupling agent to the anchor coating agent or adhesive may further enhance the adhesion. Examples of the silane coupling agent include, but are not limited to, silane coupling agents having a reactive group such as an isocyanate, epoxy, amino, ureido, or mercapto group. Strong adhesion between the base (X) and the layer (Y) via the adhesive layer (I) makes it possible to effectively prevent deterioration in the gas barrier properties or appearance of the multilayer structure of the present invention when the multilayer structure is subjected to a process such as printing or lamination, and also makes it possible to increase the drop impact resistance of a packaging material including the multilayer structure of the present invention. The thickness of the adhesive layer (I) is preferably 0.01 to 10.0 μm and more preferably 0.03 to 5.0 μm.

[Additional Layer (J)]

The multilayer structure of the present invention may further include the additional layer (J) for imparting various properties (such as heat sealing properties, barrier properties, and mechanical properties). The multilayer structure of the present invention that includes the additional layer (J) can be produced, for example, by stacking the layer (Y) on the base (X) directly or with the adhesive layer (I) interposed therebetween and then by attaching or forming the additional layer (J) on the layer (Y) directly or with the adhesive layer (I) interposed therebetween. Examples of the additional layer (J) include, but are not limited to, ink layers and thermoplastic resin layers such as a polyolefin layer and an ethylene-vinyl alcohol copolymer resin layer.

The multilayer structure of the present invention may include an ink layer on which a product name, decorative pattern, or the like is to be printed. Examples of the ink layer include a film resulting from drying of a liquid prepared by dispersing a polyurethane resin containing a pigment (e.g., titanium dioxide) in a solvent. The ink layer may be a film resulting from drying of an ink or electronic circuit-forming resist containing a polyurethane resin free of any pigment or another resin as a main component. Methods for applying the ink layer include gravure printing and various coating methods using a wire bar, a spin coater, or a die coater. The thickness of the ink layer is preferably 0.5 to 10.0 μm and more preferably 1.0 to 4.0 μm.

Placing a polyolefin layer as an outermost layer of the multilayer structure of the present invention can impart heat-sealing properties to the multilayer structure or improve the mechanical characteristics of the multilayer structure. In terms of, for example, the impartation of heat-sealing properties and the improvement in mechanical characteristics, the polyolefin is preferably polypropylene or polyethylene. It is also preferable to stack at least one film selected from the group consisting of a film made of a polyester, a film made of a polyamide, and a film made of a hydroxy group-containing polymer, in order to improve the mechanical characteristics of the multilayer structure. In terms of the improvement in mechanical characteristics, the polyester is preferably polyethylene terephthalate, the polyamide is preferably nylon-6, and the hydroxy group-containing polymer is preferably ethylene-vinyl alcohol copolymer. Between the layers there may, if desired, be provided an anchor coat layer or a layer made of an adhesive.

[Configuration of Multilayer Structure]

Specific examples of the configuration of the multilayer structure of the present invention are listed below. The multilayer structure may include one or more members (e.g., the adhesive layer (I) and additional layer (J)) other than the base (X) and layer (Y); however, the other members are omitted in the following list of specific examples. The multilayer structures listed below as specific examples may be stacked on top of each other or combined with each other.

(1) Layer (Y)/polyester layer,
(2) Layer (Y)/polyester layer/layer (Y),
(3) Layer (Y)/polyamide layer,
(4) Layer (Y)/polyamide layer/layer (Y),
(5) Layer (Y)/polyolefin layer,
(6) Layer (Y)/polyolefin layer/layer (Y),
(7) Layer (Y)/a hydroxy group-containing polymer layer,
(8) Layer (Y)/a hydroxy group-containing polymer layer/layer (Y),
(9) Layer (Y)/paper layer,
(10) Layer (Y)/paper layer/layer (Y),
(11) Layer (Y)/inorganic deposited layer/polyester layer,
(12) Layer (Y)/inorganic deposited layer/polyamide layer,
(13) Layer (Y)/inorganic deposited layer/polyolefin layer,
(14) Layer (Y)/inorganic deposited layer/a hydroxy group-containing polymer layer,
(15) Layer (Y)/polyester layer/polyamide layer/polyolefin layer,
(16) Layer (Y)/polyester layer/layer (Y)/polyamide layer/polyolefin layer,
(17) Polyester layer/layer (Y)/polyester layer/layer (Y)/inorganic deposited layer/a hydroxy group-containing polymer layer/polyolefin layer,
(18) Polyester layer/layer (Y)/polyamide layer/polyolefin layer,
(19) Layer (Y)/polyamide layer/polyester layer/polyolefin layer,
(20) Layer (Y)/polyamide layer/layer (Y)/polyester layer/polyolefin layer,
(21) Polyamide layer/layer (Y)/polyester layer/polyolefin layer,
(22) Layer (Y)/polyolefin layer/polyamide layer/polyolefin layer,
(23) Layer (Y)/polyolefin layer/layer (Y)/polyamide layer/polyolefin layer,
(24) Polyolefin layer/layer (Y)/polyamide layer/polyolefin layer,
(25) Layer (Y)/polyolefin layer/polyolefin layer,
(26) Layer (Y)/polyolefin layer/layer (Y)/polyolefin layer,
(27) Polyolefin layer/layer (Y)/polyolefin layer,
(28) Layer (Y)/polyester layer/polyolefin layer,
(29) Layer (Y)/polyester layer/layer (Y)/polyolefin layer,
(30) Polyester layer/layer (Y)/polyolefin layer,
(31) Layer (Y)/polyamide layer/polyolefin layer,
(32) Layer (Y)/polyamide layer/layer (Y)/polyolefin layer,
(33) Polyamide layer/layer (Y)/polyolefin layer,
(34) Layer (Y)/polyester layer/paper layer,
(35) Layer (Y)/polyamide layer/paper layer,
(36) Layer (Y)/polyolefin layer/paper layer,
(37) Polyolefin layer/paper layer/polyolefin layer/layer (Y)/polyester layer/polyolefin layer,
(38) Polyolefin layer/paper layer/polyolefin layer/layer (Y)/polyamide layer/polyolefin layer,
(39) Polyolefin layer/paper layer/polyolefin layer/layer (Y)/polyolefin layer,
(40) Paper layer/polyolefin layer/layer (Y)/polyester layer/polyolefin layer,
(41) Polyolefin layer/paper layer/layer (Y)/polyolefin layer,
(42) Paper layer/layer (Y)/polyester layer/polyolefin layer,
(43) Paper layer/layer (Y)/polyolefin layer,
(44) Layer (Y)/paper layer/polyolefin layer,
(45) Layer (Y)/polyester layer/paper layer/polyolefin layer,
(46) Polyolefin layer/paper layer/polyolefin layer/layer (Y)/polyolefin layer/a hydroxy group-containing polymer layer,
(47) Polyolefin layer/paper layer/polyolefin layer/layer (Y)/polyolefin layer/polyamide layer,
(48) Polyolefin layer/paper layer/polyolefin layer/layer (Y)/polyolefin layer/polyester layer,
(49) Inorganic deposited layer/layer (Y)/polyester layer,
(50) Inorganic deposited layer/layer (Y)/polyester layer/layer (Y)/inorganic deposited layer,
(51) Inorganic deposited layer/layer (Y)/polyamide layer,
(52) Inorganic deposited layer/layer (Y)/polyamide layer/layer (Y)/inorganic deposited layer,
(53) Inorganic deposited layer/layer (Y)/polyolefin layer,
(54) Inorganic deposited layer/layer (Y)/polyolefin layer/layer (Y)/inorganic deposited layer Among the above configurations, any of the configurations (1) to (8), (11) to (33), and (49) to (54) is preferred for the protective sheet of the present invention.

The multilayer structure of the present invention preferably has an oxygen transmission rate of 2.0 mL/(m$^2$·day·atm) or less, more preferably 0.50 mL/(m$^2$·day·atm) or less, even more preferably 0.30 mL/(m$^2$·day·atm) or less, at 20° C. and 85% RH before and after retorting. The conditions of the retorting, and the method and conditions of measurement of the oxygen transmission rate, are as described in "EXAMPLES" below.

The multilayer structure of the present invention preferably has a moisture permeability of 2.0 g/(m$^2$·day) or less, more preferably 1.0 g/(m$^2$·day) or less, even more preferably 0.5 g/(m$^2$·day) or less, at 40° C. and 90/0% RH before and after retorting. The conditions of the retorting, and the method and conditions of measurement of the moisture permeability, are as described in "EXAMPLES" below.

The multilayer structure of the present invention is preferably configured so that a peel strength between the layer (Y) and the adhesive layer (I) or additional layer (J) (e.g., the ink layer) is more than 100 g/15 mm, more preferably 110 g/15 mm or more, even more preferably 120 g/15 mm or more after retorting. The conditions of the retorting, and the method and conditions of measurement of the peel strength, are as described in "EXAMPLES" below.

The multilayer structure and protective sheet of the present invention preferably have an oxygen transmission rate of 2.0 mL/(m$^2$·day·atm) or less, more preferably 0.50 mL/(m$^2$·day·atm) or less, even more preferably 0.30 mL/(m$^2$·day·atm) or less, at 20° C. and 85% RH before and after a damp heat test. The conditions of the damp heat test, and the method and conditions of measurement of the oxygen transmission rate, are as described in "EXAMPLES" below.

The multilayer structure and protective sheet of the present invention preferably have a moisture permeability of 0.5 g/(m$^2$·day) or less, more preferably 0.3 g/(m$^2$·day) or less, at 40° C. and 90/0% RH before and after a damp heat test. The conditions of the damp heat test, and the method and conditions of measurement of the moisture permeability, are as described in "EXAMPLES" below.

[Applications]

The multilayer structure of the present invention and a packaging material including the multilayer structure have good gas barrier properties and good water vapor barrier properties and also have such high retort resistance that even when subjected to retorting under harsh conditions, the multilayer structure and packaging material retain good interlayer adhesion (peel strength) without suffering from appearance defects such as delamination. Thus, the multilayer structure of the present invention and the packaging material including the multilayer structure can be used in various applications.

[Packaging Material]

The packaging material of the present invention includes a multilayer structure including a base (X) and a layer (Y) stacked on the base (X). The packaging material may consist of the multilayer structure. The term "packaging material" is typically interchangeable with the term "package". The packaging material may include the multilayer structure and another member.

The packaging material according to a preferred embodiment of the present invention has barrier properties against inorganic gases (such as hydrogen, helium, nitrogen, oxygen, and carbon dioxide), natural gases, water vapor, and organic compounds that are liquid at ordinary temperature and pressure (such as ethanol and gasoline vapor).

When the packaging material of the present invention is in the form of a packaging bag, the multilayer structure may be used over the entirety of the packaging bag or the multilayer structure may be included in a part of the packaging bag. For example, the multilayer structure may constitute 50% to 100% of the overall area of the packaging bag. The same applies to the case where the packaging material is in a form other than a packaging bag (a container or lid, for example).

The packaging material of the present invention can be produced by various methods. For example, a container (packaging material) may be produced by subjecting a sheet of the multilayer structure or a film material including the multilayer structure (such a material will hereinafter be simply referred to as "film material") to a joining process and thereby forming the sheet of the multilayer structure or the film material into a predetermined container shape. Examples of the method for shaping include thermoforming, injection molding, and extrusion blow molding. Alternatively, a container (packaging material) may be produced by forming the layer (Y) on the base (X) that has been formed in a predetermined container shape beforehand. A container thus produced may be referred to as a "packaging container" herein.

The packaging material of the present invention is preferably used as a food packaging material. The packaging material of the present invention can be preferably used not only as a food packaging material but also as a packaging material for packaging any of the following: chemicals such as agrochemicals and pharmaceuticals; medical devices; industrial materials such as machinery components and delicate materials; and garments.

The packaging material including the multilayer structure of the present invention can be used after being formed into any of various shaped products by secondary processing. Such a shaped product may be a vertical form-fill-seal bag, a vacuum packaging bag, a pouch, a laminated tube container, an infusion bag, a paper container, a strip tape, a container lid, an in-mold labeled container, or a vacuum insulator. These shaped products may be formed through heat sealing.

[Vertical Form-Fill-Seal Bag]

An example of a vertical form-fill-seal bag of the present invention is shown in FIG. 1. A vertical form-fill-seal bag 10 of FIG. 1 is formed of a multilayer structure 11 of the present invention that is sealed at three portions, i.e., two edge portions 11a and a body portion 11b. The vertical form-fill-seal bag 10 can be produced by a vertical form-fill-seal machine. Various methods can be employed for bag making by a vertical form-fill-seal machine. In any method, the substance to be contained in the bag is fed through the top opening of the bag into its interior, and the opening is then sealed to produce the vertical form-fill-seal bag. The vertical form-fill-seal bag includes, for example, one film material heat-sealed at three portions, i.e., its upper edge, lower edge, and side.

[Pouch]

Figure 2:
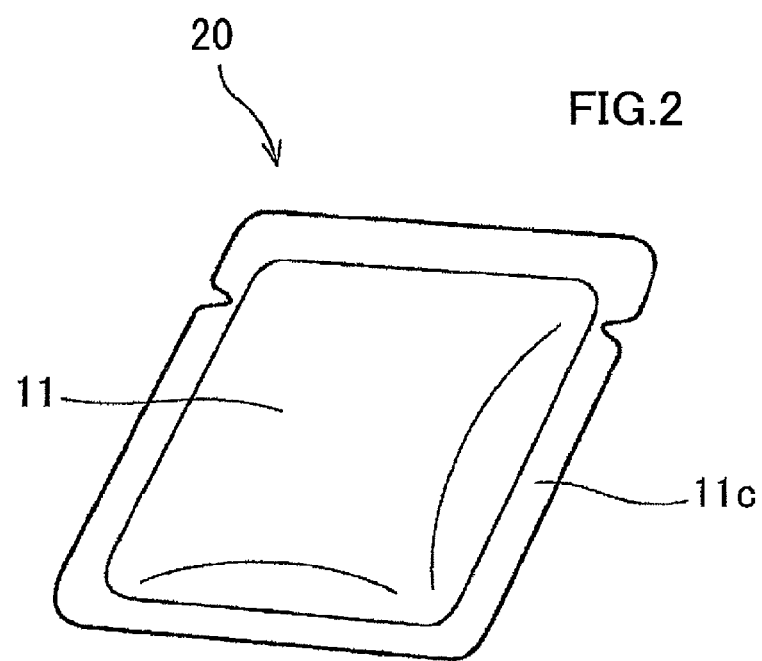
FIG. 2 is a schematic diagram of an exemplary flat pouch according to an embodiment of the present invention.

An example of a pouch of the present invention is shown in FIG. 2. A flat pouch 20 of FIG. 2 is formed of two multilayer structures 11 joined together at their edges 11c. The term "pouch" as used herein refers to a container including a film material as a barrier member and mainly intended to contain a food, a daily commodity, or a medical product. Pouches can have various shapes and applications, and examples include a spouted pouch, a zippered pouch, a flat pouch, a stand-up pouch, a horizontal form-fill-seal pouch, and a retort pouch. Such a pouch may be formed by stacking a multilayer structure and at least one additional layer (J) together.

[Infusion Bag]

Figure 3:
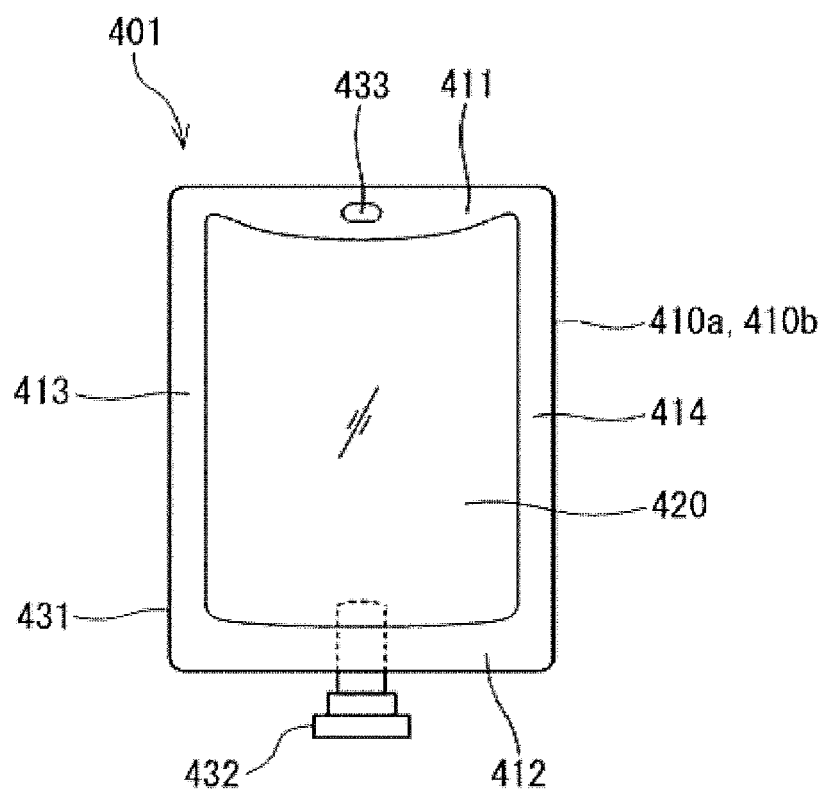
FIG. 3 is a schematic diagram of an exemplary infusion bag according to an embodiment of the present invention.

An example of an infusion bag of the present invention is shown in FIG. 3. The infusion bag is a container intended to contain an infusion drug and includes a film material as a separation barrier separating the interior for containing the infusion drug from the outside. As shown in FIG. 3, an infusion bag 401 includes a bag body 431 for containing a substance and may further include a plug member 432 attached at an edge 412 of the bag body 431. The plug member 432 functions as a passage for letting out an infusion contained in the interior of the bag body 431. The infusion bag may include a hanging hole 433 for hanging the bag, the hole being provided in an edge 411 opposite to the edge 412 at which the plug member 432 is attached. The bag body 431 is formed of two film materials 410a and 410b joined together at the edges 411, 412, 413, and 414. The film materials 410a and 410b function together as a separation barrier 420 separating the interior of the bag from the outside of the bag in a central portion of the bag body 431 which is bounded by the edges 411, 412, 413, and 414.

[In-Mold Labeled Container]

Figure 4:
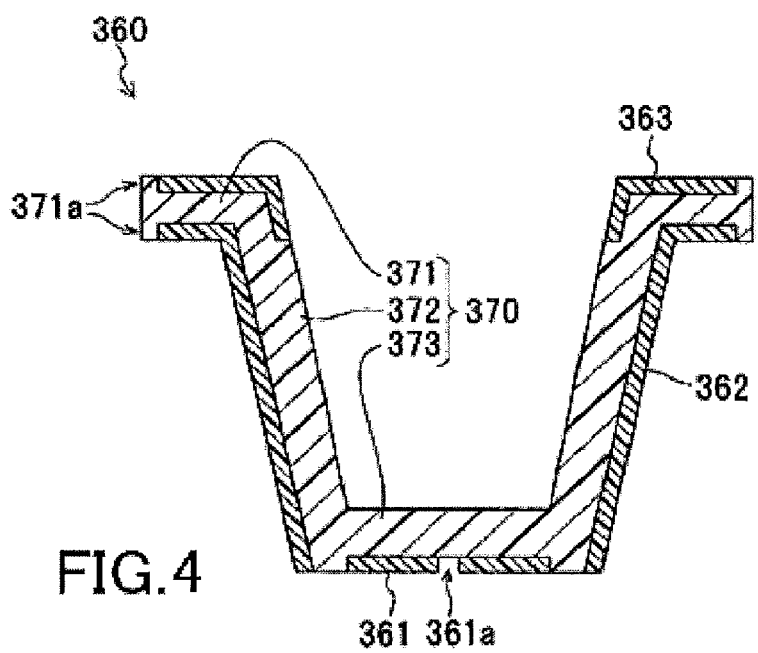
FIG. 4 is a schematic diagram of an exemplary in-mold labeled container according to an embodiment of the present invention.

A cross-sectional view of an example of an in-mold labeled container of the present invention is shown in FIG. 4. An in-mold labeled container 360 of FIG. 4 includes a cup-shaped container body 370 and multilayer labels 361 to 363 laminated to surfaces of the container body 370. The multilayer labels 361 to 363 are each the multilayer structure of the present invention. The container body 370 includes a flange portion 371, a body portion 372, and a bottom portion 373. The container body is formed through injection of a molten resin into a mold. The shape of the container body is not particularly limited, and may be, for example, a cup shape or bottle shape. The flange portion 371 has at its edges projections 371a extending upwardly and downwardly. The multilayer label 361 is disposed to cover the outer surface of the bottom portion 47. At the center of the multilayer label 361 there is formed a through hole 361a for resin injection in the in-mold labeling. The multilayer label 362 is disposed to cover the outer surface of the body portion 372 and the under surface of the flange portion 371. The multilayer label 363 is disposed to cover a part of the inner surface of the body portion 372 and the top surface of the flange portion 371. The multilayer labels 361 to 363 are fused with the container body 370 and united with the container body 360 by in-mold labeling. As shown in FIG. 4, the edge surfaces of the multilayer label 363 are fused with the container body 360 and are not exposed to the outside.

[Vacuum Insulator]

A vacuum insulator of the present invention is a heat insulator including a sheath material and a core material disposed in an interior bounded by the sheath material, and the interior in which the core material is disposed has a reduced pressure. A vacuum insulator thinner and lighter than an insulator made of urethane foam can provide heat insulating properties comparable to the heat insulating properties provided by the urethane foam insulator. The vacuum insulator of the present invention can be used, for example, as or in the following: a heat insulating material for home electric appliances such as refrigerators, hot-water supply systems, and rice cookers; a residential heat insulating material used in walls, ceilings, attics, floors, etc.; a vehicle roof member; an insulating panel for automatic vending machines etc.; and a heat transfer apparatus such as a heat storage apparatus or an apparatus employing a heat pump. When used as the sheath material, the multilayer structure of the present invention preferably includes an ethylene-vinyl alcohol copolymer resin layer and an inorganic deposited layer and may have, for example, a configuration of "polyester layer/layer (Y)/polyester layer/layer (Y)/inorganic deposited layer/ethylene-vinyl alcohol copolymer layer/polyolefin layer".

Figure 6:
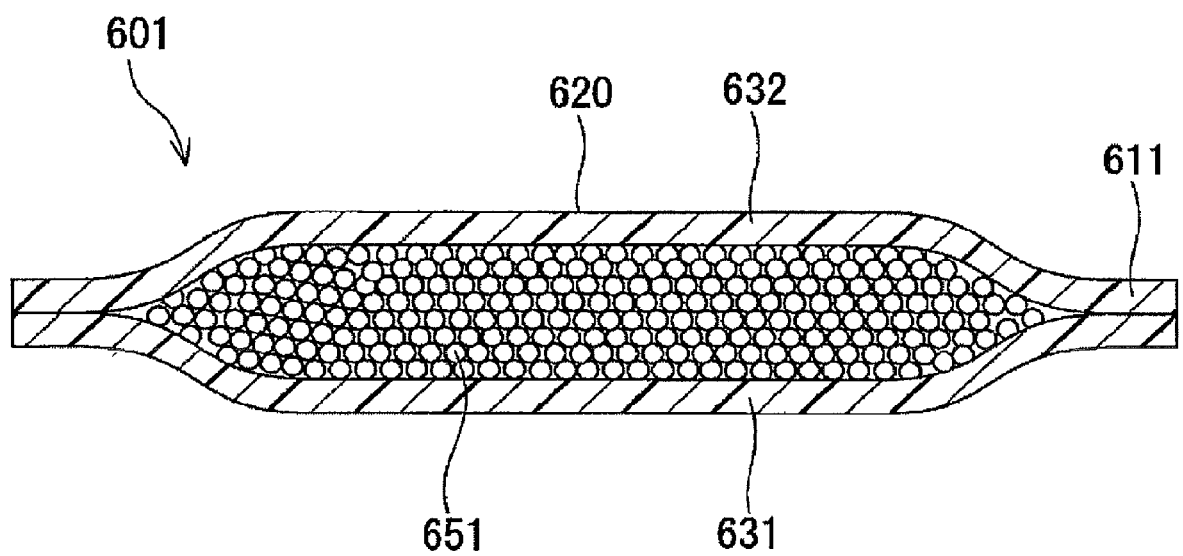
FIG. 6 is a schematic diagram of an exemplary vacuum insulator according to an embodiment of the present invention.

An example of the vacuum insulator of the present invention is shown in FIG. 6. A vacuum insulator 601 of FIG. 6 includes a core material 651 in the form of particles and two multilayer structures 631 and 632 of the present invention that together form a sheath material enclosing the core material 651. The two multilayer structures 631 and 632 are joined together at their edges 611. The interior defined by the two multilayer structures 631 and 632 is filled with the core material 651, and the interior has a reduced pressure. The two multilayer structures 631 and 632 function together as a separation barrier 620 separating the interior containing the core material 651 from the outside and, due to pressure difference between the inside and outside of the vacuum insulator 601, are in close contact with the core material 651.

Figure 7:
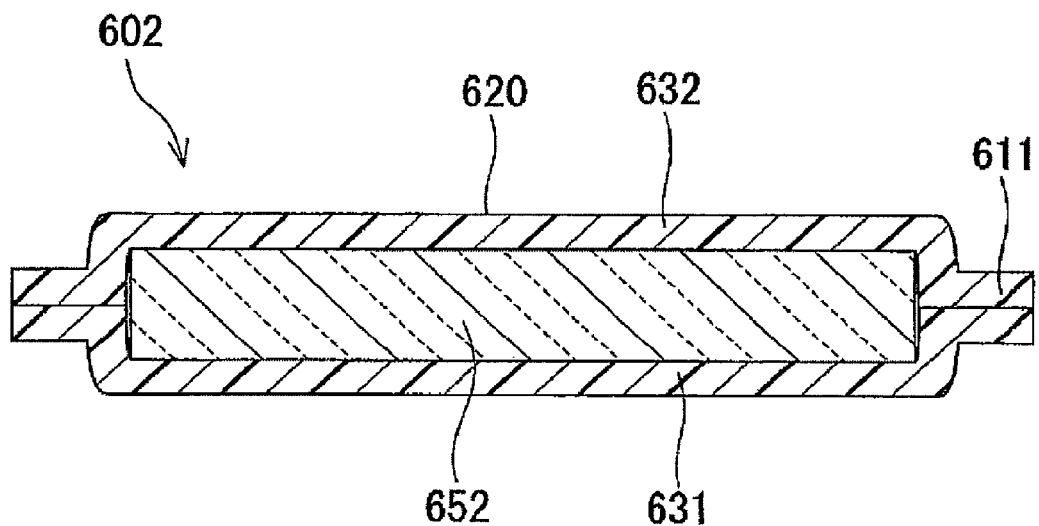
FIG. 7 is a schematic diagram of another exemplary vacuum insulator according to an embodiment of the present invention.

Another example of the vacuum insulator of the present invention is shown in FIG. 7. A vacuum insulator 602 has the same configuration as the vacuum insulator 601, except for including, instead of the core material 651, a core material 652 formed as a single body. The core material 652, which is a shaped product, is typically a foamed resin.

The component and form of the core material are not particularly limited as long as they are adapted for heat insulation. Examples of the core material include a perlite powder, a silica powder, a precipitated silica powder, diatomite, calcium silicate, glass wool, rockwool, artificial (synthetic) wool, and foamed resins (such as styrene foam and urethane foam). A hollow container or honeycomb structure formed in a predetermined shape can also be used as the core material.

[Electronic Device]

An electronic device including the multilayer structure of the present invention includes an electronic device body and a protective sheet protecting the surface of the electronic device body. The protective sheet includes the multilayer structure including the base (X) and the layer (Y). The protective sheet may consist of the multilayer structure or may include the multilayer structure and another member.

The electronic device of the present invention may be a photoelectric conversion device, an information display device, or a lighting device. Examples of the photoelectric conversion device include various solar cells and other photoelectric conversion devices. Examples of the information display device include liquid crystal displays, organic EL displays, plasma displays, electronic paper, and other information display devices. Examples of the lighting device include LED lighting, organic EL lighting, and other lighting devices.

The protective sheet for the electronic device of the present invention may have flexibility. "Flexibility" as defined herein refers to the ability to be wound into a 50-cm-diameter roll. For example, having "flexibility" means that the 50-cm-diameter roll is free of any damage when visually inspected. It is preferable for the electronic device or protective sheet to be capable of being wound into a roll with a diameter of less than 50 cm, since this means that the electronic device or protective sheet has higher pliability.

The protective sheet including the multilayer structure has good gas barrier properties and good water vapor barrier properties. In addition, the protective sheet has high transparency. The use of the protective sheet including the multilayer structure thus makes it possible to obtain a highly light transmissive electronic device that suffers little degradation even under harsh conditions.

The multilayer structure can be used as a film called a substrate film, examples of which include a substrate film for LCDs, a substrate film for organic ELs, and a substrate film for electronic paper. In this case, the multilayer structure may function both as a substrate and as a protective sheet. The electronic device to be protected by the protective sheet is not limited to those mentioned as examples above, and may be, for example, an IC tag, a device for optical communication, or a fuel cell.

The protective sheet may include a surface protection layer disposed on one or both of the surfaces of the multilayer structure. It is preferable for the surface protection layer to be a layer made of a scratch-resistant resin. A surface protection layer for a device such as a solar cell which may be used outdoors is preferably made of a resin having high weather resistance (e.g., light resistance).

For protecting a surface required to permit transmission of light, a surface protection layer having high light transmissivity is preferred. Examples of the material of the surface protection layer (surface protection film) include acrylic resins, polycarbonate, polyethylene terephthalate, polyethylene naphthalate, ethylene-tetrafluoroethylene copolymer, polytetrafluoroethylene, 4-fluoroethylene-perchloroalkoxy copolymer, 4-fluoroethylene-6-fluoropropylene copolymer, 2-ethylene-4-fluoroethylene copolymer, polychlorotrifluoroethylene, polyvinylidene fluoride, and polyvinyl fluoride. In an example, the protective sheet includes an acrylic resin layer disposed on one of its sides.

An additive (e.g., an ultraviolet absorber) may be added to the surface protection layer to increase the durability of the surface protection layer. A preferred example of the surface protection layer having high weather resistance is an acrylic resin layer to which an ultraviolet absorber has been added. Examples of the ultraviolet absorber include, but are not limited to, ultraviolet absorbers based on benzotriazole, benzophenone, salicylate, cyanoacrylate, nickel, or triazine. In addition, another additive such as a stabilizer, light stabilizer, or antioxidant may be used in combination.

The electronic device body may be sealed with a sealing material. The sealing material is not particularly limited, and a sealing material commonly used as a sealing material for electronic devices may be used. Examples of the material of the sealing material include ethylene-vinyl acetate copolymer.

When the protective sheet is joined to the sealing material for sealing the electronic device body, it is preferable for the protective sheet to include a resin layer for joining which is highly adhesive to the sealing material. Examples of the resin layer for joining which may be used when the sealing material is formed of ethylene-vinyl acetate copolymer include a polyethylene terephthalate layer with improved adhesion to ethylene-vinyl acetate copolymer. The layers constituting the protective sheet may be bonded together using a known adhesive or an adhesive layer as described above.

Figure 8:
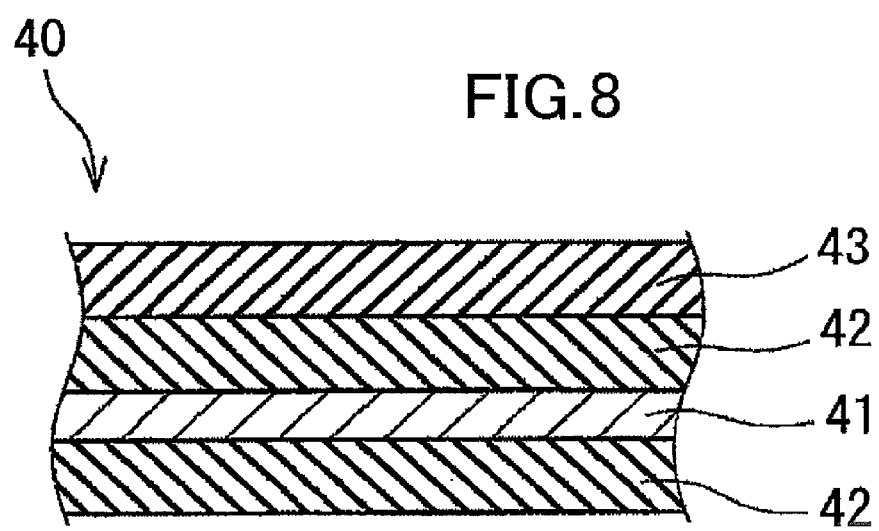
FIG. 8 is a partial cross-sectional view of an electronic device according to an embodiment of the present invention.

A partial cross-sectional view of an example of the electronic device of the present invention is shown in FIG. 8. An electronic device 40 of FIG. 8 includes an electronic device body 41, a sealing material 42 for sealing the electronic device body 41, and a protective sheet (multilayer structure) 43 for protecting the surface of the electronic device body 41. The sealing material 42 covers the entire surface of the electronic device body 41. The protective sheet 43 is disposed over one side of the electronic device body 41, with the sealing material 42 interposed therebetween. On the side opposite to that where the protective sheet 43 is disposed there may be disposed another protective sheet. In this case, the protective sheet disposed on the opposite side may be the same as or different from the protective sheet 43. It suffices for the protective sheet 43 to be disposed in such a manner as to protect the surface of the electronic device 41. The protective sheet 43 may be disposed over the electronic device body 41, with another member such as the sealing material 42 interposed therebetween, or may be disposed directly on the surface of the electronic device body 41.

Examples of the electronic device body 41 include, but are not particularly limited to: photoelectric conversion devices such as solar cells; information display devices such as organic EL displays, liquid crystal displays, and electronic paper; and lighting devices such as organic EL elements. The sealing material 42 is an optional member that can be added as appropriate depending on, for example, the type and use of the electronic device body 41. Examples of the sealing material 42 include ethylene-vinyl acetate copolymer and polyvinyl butyral.

A preferred example of the electronic device body 41 is a solar cell. Examples of the solar cell include a silicon solar cell, a compound semiconductor solar cell, and an organic thin-film solar cell. Examples of the silicon solar cell include a monocrystalline silicon solar cell, a polycrystalline silicon solar cell, and an amorphous silicon solar cell. Examples of the compound semiconductor solar cell include a III-V compound semiconductor solar cell, a II-VI compound semiconductor solar cell, and a I-III-VI compound semiconductor solar cell. The solar cell may or may not be an integrated solar cell including a plurality of unit cells connected in series.

Depending on its type, the electronic device body 41 can be produced by a so-called roll-to-roll process. In the roll-to-roll process, a flexible substrate (e.g., a stainless steel substrate or a resin substrate) wound around a feed roll is delivered from the feed roll, then an element is formed on this substrate to produce the electronic device body 41, and finally the electronic device body 41 is wound on a take-up roll. In this case, it is advantageous that the protective sheet 43 be prepared beforehand in the form of a flexible long sheet, more particularly in the form of a wound roll of the long sheet. In an example, the protective sheet 43 delivered from a feed roll is stacked onto the electronic device body 41 that has yet to be wound on the take-up roll and is wound up together with the electronic device body 41. In another example, the electronic device body 41 that has been wound on the take-up roll once may be fed from the roll again and stacked onto the protective sheet 43. In a preferred example of the present invention, the electronic device per se has flexibility.

The protective sheet 43 includes the multilayer structure of the present invention. The protective sheet 43 may consist of the multilayer structure. Alternatively, the protective sheet 43 may include the multilayer structure and another member (e.g., the additional layer (J)) stacked on the multilayer structure. The thickness and material of the protective sheet 43 are not particularly limited, as long as the protective sheet 43 is a sheet of layered product suitable for protection of a surface of an electronic device and includes the multilayer structure described above.

EXAMPLES

Hereinafter, the present invention will be described in more detail by way of examples. The present invention is not limited by these examples in any respect, and many modifications can be made by any ordinarily skilled person in the art within the technical concept of the present invention. Analysis and evaluation in Examples and Comparative Examples given below were performed as will now be described.

(1) Measurement of Infrared Absorption Spectrum

An infrared absorption spectrum of the layer (Y) side of multilayer structures obtained in Examples and Comparative Examples was measured by attenuated total reflection spectroscopy using a Fourier transform infrared spectrophotometer. The measurement conditions were as follows.

Apparatus: Spectrum One, manufactured by PerkinElmer, Inc.

Measurement mode: Attenuated total reflection spectroscopy

Measurement range: 800 to 1,400 $cm^{-1}$ (2) Measurement of Respective Thicknesses of Layers Each multilayer structure was cut using a focused ion beam (FIB) to prepare a section (thickness: 0.3 μm) for cross-sectional observation. The prepared section was secured to a sample stage with a carbon tape and subjected to platinum ion sputtering at an accelerating voltage of 30 kV for 30 seconds. The cross-section of the multilayer structure was observed using a field-emission transmission electron microscope to determine the respective thicknesses of the layers. The measurement conditions were as follows.

Apparatus: JEM-2100F, manufactured by JEOL Ltd.

Accelerating voltage: 200 kV

Magnification: ×250,000

(3) Analysis of Composition of Multilayer Structure

The composition analysis was performed from the layer (Y) side by parallel angle-resolved X-ray photoelectron spectroscopy.

The narrow scan measurement was performed for the Al and C elements in angle-resolved lens mode. Waveform separation and semiquantification of spectra obtained for detection angles were performed. From an angle profile obtained, the Al/C ratio was determined.

Apparatus: VG Theta Probe, manufactured by Thermo Fisher Scientific Inc.

Irradiated X-ray: Single-crystal radiation AlKα

X-ray spot size: 800×400 μm

Detection angles in angle-resolved mode: 16 angles selected in the range from 81.13° to 24.88° at intervals of 3.75°

(4) Measurement of Water Contact Angle of Multilayer Structure

The water contact angle of the layer (Y) was measured using a contact angle meter.

Apparatus: Drop Master DM-500, manufactured by Kyowa Interface Science Co., Ltd.
Droplet: 2.0 μL
Waiting time: 2.0 seconds (5) Measurement of Oxygen Transmission Rate A sample was set to an oxygen transmission rate measurement apparatus in such a manner that the layer as the base faced the carrier gas side, and the oxygen transmission rate was measured by an equal pressure method. The measurement conditions were as follows.

Apparatus: OX-TRAN 2/21, manufactured by MOCON, Inc.
Temperature: 20° C.
Humidity on oxygen feed side: 85% RH
Humidity on carrier gas side: 85% RH
Oxygen pressure: 1.0 atm
Carrier gas pressure: 1.0 atm (6) Measurement of Moisture Permeability A sample was set to a water vapor transmission rate measurement apparatus in such a manner that the layer as the base faced the carrier gas side, and the moisture permeability (water vapor transmission rate) was measured by an equal pressure method. The measurement conditions were as follows.

Apparatus: PERMATRAN W3/33, manufactured by MOCON, Inc.
Temperature: 40° C.
Humidity on water vapor feed side: 90% RH
Humidity on carrier gas side: 0% RH (7) Evaluation of Adhesion The adhesion between the layer (Y) and a layer (adhesive layer in the present examples) contiguous to the layer (Y) was evaluated by measurement of a T-peel strength (adhesive strength per 15 mm width). The measurement was performed 5 times, and an average of the measured values was employed as an index. The measurement conditions were as follows.

Apparatus: Autograph AGS-H, manufactured by Shimadzu Corporation
Peel rate: 250 mm/min
Temperature: 23° C.
Humidity: 50% RH (8) Evaluation of Appearance of Protective Sheet Subjected to Damp Heat Test The appearance of protective sheets subjected to a damp heat test was visually evaluated according to the following criteria.

A: The multilayer structure was free of delamination between the layers and had good appearance.

B: The multilayer structure was observed to have partial delamination between the layers.

<Synthesis Example of Phosphorus Compound (BH-1)>

Under a nitrogen atmosphere, 5.0 parts by mass of 11-bromoundecanol and 2.0 parts by mass of trimethylamine were mixed with 5.0 parts by mass of dichloromethane, and the resulting solution was cooled to 0° C. To the resulting solution was added dropwise a solution prepared by mixing 1.9 parts by mass of acetyl chloride in 2.0 parts by mass of dichloromethane, and the dropwise addition was followed by stirring at 0° C. for 2 hours. The solution was washed with water to pH 6, after which the dichloromethane layer was isolated and dried over sodium sulfate. The solvent was distilled to obtain 5.5 parts by mass of 11-bromoundecyl acetate.

An amount of 3.0 parts by mass of the obtained 11-bromoundecyl acetate and 4.0 parts by mass of triethyl phosphite were mixed and stirred at 150° C. for 15 hours. Subsequently, excess triethyl phosphite was distilled at a reduced pressure to obtain 3.3 parts by mass of diethyl(11-acetoxyundecyl)phosphonate.

An amount of 3.3 parts by mass of the obtained diethyl (11-acetoxyundecyl)phosphonate was dissolved in 5.0 parts by mass of dioxane, to the resulting solution was added 2.4 parts by mass of concentrated hydrochloric acid. The resulting solution was stirred at 100° C. for 3 days. After cooling, diethyl ether was added to isolate the aqueous layer, which was neutralized to pH 7 with a 0.1 mass % aqueous solution of sodium hydroxide. The precipitate was collected by filtration, followed by reprecipitation with water and methanol to obtain 3.0 parts by mass of a sodium salt of 11-hydroxyundecylphosphonic acid. The sodium salt was desalted by an ion exchange resin to obtain a phosphorus compound (BH-1). The phosphorus compound (BH-1) is 11-hydroxyundecylphosphonic acid (11-HUPA).

<Synthesis Example of Phosphorus Compound (BH-2)>

4-Hydroxybutylphosphonic acid (4-HBPA) was obtained in the same manner as in the synthesis example of the phosphorus compound (BH-1), except for using 4-bromobutanol instead of 11-bromoundecanol.

<Synthesis Example of Phosphorus Compound (BH-3)>

20-Hydroxyeicosylphosphonic acid (20-HEPA) was obtained in the same manner as in the synthesis example of the phosphorus compound (BH-1), except for using 20-bromoeicosanol instead of 11-bromoundecanol.

<Synthesis Example of Phosphorus Compound (BH—C1)>

2-Hydroxyethylphosphonic acid (2-HEPA) was obtained in the same manner as in the synthesis example of the phosphorus compound (BH-1), except for using 2-bromoethanol instead of 11-bromoundecanol.

<Production Example of Coating Liquid (S1-1)>

Distilled water in an amount of 230 parts by mass was heated to 70° C. under stirring. Triisopropoxyaluminum in an amount of 88 parts by mass was added dropwise to the distilled water over 1 hour, the liquid temperature was gradually increased to 95° C., and isopropanol generated was distilled off. In this manner, hydrolytic condensation was performed. To the resulting liquid was added 4.0 parts by mass of a 60 mass % aqueous nitric acid solution, and this was followed by stirring at 95° C. for 3 hours to deflocculate agglomerates of particles of the hydrolytic condensate. After that, the liquid was concentrated so that the concentration of solids calculated as aluminum oxide was adjusted to 10 mass %. To 22.44 parts by mass of the solution thus obtained was added 54.34 parts by mass of distilled water. The solution was stirred to homogeneity to obtain a dispersion. Subsequently, 4.40 parts by mass of an 85 mass % aqueous phosphoric acid solution was added dropwise to the dispersion under stirring, with the liquid temperature held at 15° C. A solution of 0.015 parts by mass of 11-HUPA as the phosphorus compound (BH-1) was further added dropwise to 18.80 parts by mass of a methanol solution. The stirring was continued at 15° C. until a viscosity of 1,500 mPa·s was reached. The intended coating liquid (S-1) was thus obtained. In the coating liquid (S-1), the ratio $M_{BH}/M_{BI}$ of the number of moles $M_{BH}$ of the phosphorus compound (BH-1) to the number of moles $M_{BI}$ of the inorganic phosphorus compound (BI) was $1.6 \times 10^{-3}$ and the molar ratio between aluminum atoms and phosphorus atoms, as expressed by [aluminum atoms]:[phosphorus atoms], was 1.15:1.00.

<Production Examples of Coating Liquids (S1-2) to (S1-10) and (S1-C2) to (S1-C5)>

Coating liquids (S1-2) to (S1-10) and (S1-C2) to (S1-C5) were prepared in the same manner as in the preparation of the coating liquid (S1-1), except for changing the type of the phosphorus compound (BH) and the ratio $M_{BH}/M_{BI}$ of the number of moles $M_{BH}$ of the phosphorus compound (BH) to the number of moles $M_{BI}$ of the inorganic phosphorus compound (BI) as shown in Table 1. In the preparation of the coating liquids (S1-8) and (S1-9), 4-hydroxybutyl dihydrogen phosphate (4-HBDP) (manufactured by Chemos GmbH & Co. KG) was used as a phosphorus compound (BH-4). In the preparation of the coating liquid (S1-10), 10-carboxydecylphosphonic acid (10-CDPA) (manufactured by DOJINDO LABORATORIES) was used as a phosphorus compound (BH-5). In the preparation of the coating liquids (S1-C3) to (S1-C5), 1-undecanol (manufactured by Wako Pure Chemical Industries, Ltd.), 1,11-undecanediol (manufactured by Combi Blocks Inc.), and dodecylphosphonic acid (manufactured by WAKO CHEMICAL, CO., LTD.) were respectively used instead of the phosphorus compound (BH-1).

<Production Example of Coating Liquid (S2-1)>

Distilled water in an amount of 230 parts by mass was heated to 70° C. under stirring. Triisopropoxyaluminum in an amount of 88 parts by mass was added dropwise to the distilled water over 1 hour, the liquid temperature was gradually increased to 95° C., and isopropanol generated was distilled off. In this manner, hydrolytic condensation was performed. To the resulting liquid was added 4.0 parts by mass of a 60 mass % aqueous nitric acid solution, and this was followed by stirring at 95° C. for 3 hours to deflocculate agglomerates of particles of the hydrolytic condensate. After that, the liquid was concentrated so that the concentration of solids calculated as aluminum oxide was adjusted to 10 mass %. To 22.50 parts by mass of the solution thus obtained was added 54.29 parts by mass of distilled water. The solution was stirred to homogeneity to obtain a dispersion. Subsequently, 4.41 parts by mass of an 85 mass % aqueous phosphoric acid solution and 18.80 parts by mass of methanol were added dropwise to the dispersion under stirring, with the liquid temperature held at 15° C. The stirring was continued at 15° C. until a viscosity of 1,500 mPa·s was reached. The intended coating liquid (S2-1) was thus obtained. In the coating liquid (S2-1), the molar ratio between aluminum atoms and phosphorus atoms, as expressed by [aluminum atoms]:[phosphorus atoms], was 1.15:1.00.

<Production Example of Coating Liquid (T-1)>

The phosphorus compound (BH-1) obtained in the above synthesis example was dissolved in a mixed solvent of water and methanol (at a mass ratio, [water]:[methanol], of 7:3) to obtain a coating liquid (T-1) having a solids concentration of 0.1 mass %.

<Production Example of Coating Liquid (T-2)>

10-Carboxydecylphosphonic acid (10-CDPA) (manufactured by DOJINDO LABORATORIES) was dissolved in a mixed solvent of water and methanol (at a mass ratio, [water]:[methanol], of 7:3) to obtain a coating liquid (T-2) having a solids concentration of 0.1 mass %.

The details of films used in Examples and Comparative Examples are as follows.

1) PET 12: Biaxially-oriented polyethylene terephthalate film, manufactured by Toray Industries, Inc. under the trade name "Lumirror P60" and having a thickness of 12 μm 2) ONY 15: Biaxially-oriented nylon film, manufactured by UNITIKA LTD. under the trade name "EMBLEM ONBC" and having a thickness of 15 μm 3) CPP 60: Non-oriented polypropylene film, manufactured by Mitsui Chemicals Tohcello, Inc. under the trade name "RXC-22" and having a thickness of 60 μm 4) CPP 70: Non-oriented polypropylene film, manufactured by Mitsui Chemicals Tohcello, Inc. under the trade name "RXC-21" and having a thickness of 70 μm 5) CPP 100: Non-oriented polypropylene film, manufactured by Mitsui Chemicals Tohcello, Inc. under the trade name "RXC-21" and having a thickness of 100 μm 7) PET 50: Polyethylene terephthalate film with improved adhesion to ethylene-vinyl acetate copolymer, manufactured by TOYOBO CO., LTD. under the trade name "SHINEBEAM (registered trademark) Q1A15" and having a thickness of 50 μm Example 1

Example 1-1

A PET 12 (which may hereinafter be abbreviated as "X-1") was prepared as the base (X). The coating liquid (S1-1) was applied onto the base using a bar coater so that the dry thickness would be 0.4 μm. The film of the applied liquid was dried at 110° C. for 5 minutes and then heat-treated at 220° C. for 1 minute to form a layer (Y-1-1). In this manner, a multilayer structure (1-1-1) having a configuration of "base (X-1)/layer (Y-1-1)" was obtained.

As a result of measurement of the infrared absorption spectrum of the multilayer structure (1-1-1), a maximum absorption wavenumber in the region from 800 to 1,400 $cm^{-1}$ was determined to be 1,108 $cm^{-1}$, and the width at half maximum of the maximum absorption band was determined to be 37 $cm^{-1}$. As a result of composition analysis performed for the multilayer structure (1-1-1) from the layer (Y-1-1) side, the C/Al ratio was determined to be 0.5 to 1.5 between the surface not in contact with the base (X-1) and a depth of 5 nm below the surface. The water contact angle of the multilayer structure (1-1-1) was measured to be 61.8°.

An ink layer was formed on the obtained multilayer structure (1-1-1), which was then allowed to stand at 40° C. for 1 day for aging. After that, an adhesive layer was formed on the ink layer, and an ONY 15 was laminated on the adhesive layer to obtain a layered product. Next, an adhesive layer was formed on the ONY 15 of the layered product, then a CPP 70 was laminated on the adhesive layer, and the resulting laminate was allowed to stand at 40° C. for 5 days for aging. In this way, a multilayer structure (1-1-2) having a configuration of "base (X-1)/layer (Y-1-1)/ink layer/adhesive layer/ONY 15/adhesive layer/CPP 70" was obtained. The two adhesive layers were each formed by applying a two-component adhesive using a bar coater in such a manner that the dry thickness would be 4 μm and then by drying the adhesive. The two-component adhesive used was a two-component reactive polyurethane adhesive composed of "A-520" (product name) of "TAKELAC" (registered trademark) manufactured by Mitsui Chemicals, Inc. and "A-50" (product name) of "TAKENATE" (registered trademark) manufactured by Mitsui Chemicals, Inc. The ink layer was formed by applying an ink using a bar coater in such a manner that the dry thickness would be 2 μm and then by drying the ink. The ink used was an ink composed of "R641

AT White" (product name) of "Fine Star" (registered trademark) manufactured by TOYO INK CO., LTD. and "LP Super Curing Agent" (product name) manufactured by TOYO INK CO., LTD. The oxygen transmission rate and moisture permeability of the multilayer structure (1-1-2) were measured by the methods previously described. The results are shown in Table 2.

The multilayer structure (1-1-2) was heat-sealed to form a pouch, and the pouch was filled with 100 g of water. The pouch thus obtained was then subjected to retorting (hot water retaining method) under the following conditions.

Retorting apparatus: Flavor Ace RSC-60, manufactured by HISAKA WORKS, LTD.
Temperature: 125° C.
Time: 30 minutes
Pressure: 0.18 MPaG Immediately after the hot water treatment, a measurement sample was cut out from the pouch, and the oxygen transmission rate, moisture permeability, and T-peel strength of the sample were measured by the methods previously described. The results are shown in Table 2. The multilayer structure (1-1-2) showed no appearance defect such as delamination.

Examples 1-2 to 1-10

Multilayer structures (1-2-1) to (1-10-1) were produced in the same manner as the multilayer structure (1-1-1) of Example 1-1, except for using the coating liquids (S1-2) to (S1-10) instead of the coating liquid (S1-1). Multilayer structures (1-2-2) to (1-10-2) were produced and evaluated in the same manner as the multilayer structure (1-1-2) of Example 1-1, except for using the multilayer structures (1-2-1) to (1-10-1) instead of the multilayer structure (1-1-1). The evaluation results are shown in Tables 1 and 2. As in Example 1-1, the multilayer structures (1-2-2) to (1-10-2) showed no appearance defect such as delamination.

Example 1-11

A PET 12 was prepared as the base (X). The coating liquid (S2-1) was applied onto the base using a bar coater so that the dry thickness would be 0.4 μm. The film of the applied liquid was dried at 110° C. for 5 minutes and then heat-treated at 160° C. for 1 minute to form a precursor layer of a layer (Y-11-1) on the base. Next, the coating liquid (T-1) was applied using a bar coater so that the ratio $M_{BH}/M_{BI}$ of the number of moles $M_{BH}$ of the phosphorus compound (BH-1) to the number of moles $M_{BI}$ of the inorganic phosphorus compound (BI) would be $4.3 \times 10^{-3}$, and the applied liquid was dried at 110° C. for 3 minutes. This was followed by heat treatment at 220° C. for 1 minute to form a layer (Y-11-1). In this way, a multilayer structure (1-11-1) having a configuration of "base (X)/layer (Y-11-1)" was obtained.

A multilayer structure (1-11-2) was produced and evaluated in the same manner as the multilayer structure (1-1-2) of Example 1-1, except for using the multilayer structure (1-11-1) instead of the multilayer structure (1-1-1). The evaluation results are shown in Tables 1 and 2. As in Example 1-1, the multilayer structure (1-11-2) showed no appearance defect such as delamination.

Examples 1-12 and 1-13

Multilayer structures (1-12-2) and (1-13-2) were produced and evaluated in the same manner as the multilayer structure (1-11-2) of Example 1-11, except for changing the type of the coating liquid (T) and the ratio $M_{BH}/M_{BI}$ of the number of moles $M_{BH}$ of the phosphorus compound (BH) to the number of moles $M_{BI}$ of the inorganic phosphorus compound (BI) according to Table 1. The evaluation results are shown in Tables 1 and 2. As in Example 1-11, the multilayer structures (1-12-2) and (1-13-2) showed no appearance defect such as delamination.

Comparative Example 1-1

A multilayer structure (C1-1-2) was produced and evaluated in the same manner as the multilayer structure (1-1-2) of Example 1-1, except for using the coating liquid (S2-1) instead of the coating liquid (S1-1). The evaluation results are shown in Tables 1 and 2. The multilayer structure (C1-1-2) showed an appearance defect attributed to delamination.

Comparative Examples 1-2 to 1-5

Multilayer structures (C1-2-1) to (C1-5-1) were produced in the same manner as the multilayer structure (1-1-1) of Example 1-1, except for using the coating liquids (S1-C2) to (S1-C5) instead of the coating liquid (S1-1). Multilayer structures (C1-2-2) to (C1-5-2) were produced and evaluated in the same manner as the multilayer structure (1-1-2) of Example 1-1, except for using the multilayer structures (C1-2-1) to (C1-5-1) instead of the multilayer structure (1-1-1). The evaluation results are shown in Tables 1 and 2. The multilayer structures (C1-2-2) to (C1-5-2) showed an appearance defect attributed to delamination.

TABLE 1

| | | | | | Layer (Y) | | | | |
|---|---|---|---|---|---|---|---|---|---|
| | Multilayer structure No. | Base (X) | Coating liquid (S) No. | Coating liquid (T) No. | Compound name | Polar group | Phosphorus functional group | Carbon number | Molar ratio $M_{BH}/M_{BI}$ | Contact angle (°) |
| Example 1-1 | 1-1-1 | PET12 | S1-1 | — | 11-HUPA | Hydroxy group | Phosphonic acid | 11 | $1.6 \times 10^{-3}$ | 61.8 |
| Example 1-2 | 1-2-1 | PET12 | S1-2 | — | 11-HUPA | Hydroxy group | Phosphonic acid | 11 | $8.0 \times 10^{-5}$ | 43.4 |
| Example 1-3 | 1-3-1 | PET12 | S1-3 | — | 11-HUPA | Hydroxy group | Phosphonic acid | 11 | $3.3 \times 10^{-4}$ | 50.6 |
| Example 1-4 | 1-4-1 | PET12 | S1-4 | — | 11-HUPA | Hydroxy group | Phosphonic acid | 11 | $4.7 \times 10^{-3}$ | 65.8 |
| Example 1-5 | 1-5-1 | PET12 | S1-5 | — | 11-HUPA | Hydroxy group | Phosphonic acid | 11 | $6.3 \times 10^{-3}$ | 68.3 |
| Example 1-6 | 1-6-1 | PET12 | S1-6 | — | 4-HBPA | Hydroxy group | Phosphonic acid | 4 | $1.6 \times 10^{-3}$ | 48.6 |
| Example 1-7 | 1-7-1 | PET12 | S1-7 | — | 20-HEPA | Hydroxy group | Phosphonic acid | 20 | $1.6 \times 10^{-3}$ | 72.4 |
| Example 1-8 | 1-8-1 | PET12 | S1-8 | — | 4-HBDP | Hydroxy group | Phosphoric acid ester | 4 | $1.6 \times 10^{-3}$ | 46.1 |
| Example 1-9 | 1-9-1 | PET12 | S1-9 | — | 4-HBDP | Hydroxy group | Phosphoric acid ester | 4 | $4.7 \times 10^{-3}$ | 59.3 |
| Example 1-10 | 1-10-1 | PET12 | S1-10 | — | 10-CDPA | Carboxy group | Phosphonic acid | 10 | $4.7 \times 10^{-3}$ | 61.3 |
| Example 1-11 | 1-11-1 | PET12 | S2-1 | T-1 | 11-HUPA | Hydroxy group | Phosphonic acid | 11 | $4.3 \times 10^{-3}$ | 68.1 |
| Example 1-12 | 1-12-1 | PET12 | S2-1 | T-1 | 11-HUPA | Hydroxy group | Phosphonic acid | 11 | $1.9 \times 10^{-2}$ | 69.4 |

TABLE 1-continued

| | Multilayer structure No. | Base (X) | Coating liquid (S) No. | Coating liquid (T) No. | Layer (Y) Compound name | Polar group | Phosphorus functional group | Carbon number | Molar ratio $M_{BH}/M_{BI}$ | Contact angle (°) |
|---|---|---|---|---|---|---|---|---|---|---|
| Example 1-13 | 1-13-1 | PET12 | S2-1 | T-2 | 10-CDPA | Carboxy group | Phosphonic acid | 10 | $4.0 \times 10^{-3}$ | 62.2 |
| Comparative Example 1-1 | C1-1-1 | PET12 | S2-1 | — | — | — | — | — | — | 21.6 |
| Comparative Example 1-2 | C1-2-1 | PET12 | S1-C2 | — | 2-HEPA | Hydroxy group | Phosphonic acid | 2 | $1.6 \times 10^{-3}$ | 24.5 |
| Comparative Example 1-3 | C1-3-1 | PET12 | S1-C3 | — | 1-undecanol | Hydroxy group | — | 11 | $4.7 \times 10^{-3}$ | 53.2 |
| Comparative Example 1-4 | C1-4-1 | PET12 | S1-C4 | — | 1,11-undecanediol | Hydroxy group | — | 11 | $4.7 \times 10^{-3}$ | 55.0 |
| Comparative Example 1-5 | C1-5-1 | PET12 | S1-C5 | — | DPPA | — | Phosphonic acid | 12 | $1.6 \times 10^{-3}$ | 100.4 |

[Abbreviations in table]
2-HEPA: 2-hydroxyethylphosphonic acid
4-HBPA: 4-hydroxybutylphosphonic acid
4-HBDP: 4-hydroxybutyl dihydrogen phosphate
10-CDPA: 10-carboxydecylphosphonic acid
11-HUPA: 11-hydroxyundecylphosphonic acid
20-HEPA: 20-hydroxyicosylphosphonic acid
DPPA: Dodecylphosphonic acid

TABLE 2

| | Multilayer structure No. | Oxygen transmission rate Before retorting ($mL/(m^2 \cdot day \cdot atm)$) | Oxygen transmission rate After retorting ($mL/(m^2 \cdot day \cdot atm)$) | Moisture permeability Before retorting ($g/(m^2 \cdot day)$) | Moisture permeability After retorting ($g/(m^2 \cdot day)$) | Peel strength After retorting (g/15 mm) |
|---|---|---|---|---|---|---|
| Example 1-1 | 1-1-2 | 0.21 | 0.22 | 0.2 | 0.2 | 350 |
| Example 1-2 | 1-2-2 | 0.22 | 0.22 | 0.2 | 0.2 | 180 |
| Example 1-3 | 1-3-2 | 0.21 | 0.22 | 0.2 | 0.2 | 300 |
| Example 1-4 | 1-4-2 | 0.31 | 0.33 | 0.3 | 0.4 | 370 |
| Example 1-5 | 1-5-2 | 1.43 | 1.52 | 1.3 | 1.2 | 380 |
| Example 1-6 | 1-6-2 | 0.20 | 0.22 | 0.2 | 0.2 | 300 |
| Example 1-7 | 1-7-2 | 0.24 | 0.25 | 0.2 | 0.2 | 360 |
| Example 1-8 | 1-8-2 | 0.21 | 0.21 | 0.2 | 0.2 | 270 |
| Example 1-9 | 1-9-2 | 0.22 | 0.23 | 0.2 | 0.2 | 300 |
| Example 1-10 | 1-10-2 | 0.33 | 0.35 | 0.2 | 0.2 | 120 |
| Example 1-11 | 1-11-2 | 0.20 | 0.20 | 0.2 | 0.2 | 380 |
| Example 1-12 | 1-12-2 | 0.20 | 0.20 | 0.2 | 0.2 | 120 |
| Example 1-13 | 1-13-2 | 0.21 | 0.20 | 0.2 | 0.2 | 380 |
| Comparative Example 1-1 | C1-1-2 | 0.20 | 0.20 | 0.2 | 0.2 | 20 |
| Comparative Example 1-2 | C1-2-2 | 0.20 | 0.20 | 0.2 | 0.2 | 50 |
| Comparative Example 1-3 | C1-3-2 | 0.34 | 0.42 | 0.4 | 0.4 | 10 |
| Comparative Example 1-4 | C1-4-2 | 0.37 | 0.41 | 0.4 | 0.4 | 10 |
| Comparative Example 1-5 | C1-5-2 | 1.21 | 1.32 | 0.9 | 1.2 | 10 |

[Example 2] Vertical Form-Fill-Seal Bag

Example 2-1

The multilayer structure (1-1-2) as produced in Example 1-1 was cut into a 400-mm-wide piece, which was fed to a vertical form-fill-seal packaging machine (manufactured by ORIHIRO Co., Ltd.) in such a manner that the heat sealing would be performed with the CPP layers being in contact with each other. Using the vertical form-fill-seal packaging machine, a vertical form-fill-seal bag (2-1-3) of the fin seal type (width: 160 mm, length: 470 mm) as shown in FIG. 1 was produced. A measurement sample was cut out from the vertical form-fill-seal bag (2-1-3). The oxygen transmission rate and moisture permeability of the sample yet to be subjected to retorting were measured. The results are shown in Table 3. Another vertical form-fill-seal bag (2-1-3) was heat-sealed to form a pouch, and the pouch was filled with 300 mL of water. The pouch obtained was then subjected to retorting (hot water retaining method) under the same conditions as in Example 1-1.

Immediately after the hot water treatment, a measurement sample was cut out from the pouch, and the oxygen transmission rate, moisture permeability, and T-peel strength of the sample were measured by the methods previously described. The results are shown in Table 3. No appearance defect such as delamination was observed.

Examples 2-2 to 2-13 and Comparative Examples 2-1 to 2-5

Vertical form-fill-seal bags (2-2-3) to (2-13-3) and (C2-1-3) to (C2-5-3) were produced in the same manner as in the production of the vertical form-fill-seal bag (2-1-3) of Example 2-1, except for using, instead of the multilayer structure (1-1-2), the multilayer structures (1-2-2) to (1-13-2) and (C1-1-2) to (C1-5-2) as produced in Examples 1-2 to 1-13 and Comparative Examples 1-1 to 1-5. For the vertical form-fill-seal bags obtained, the various properties were measured in the same manner as in Example 2-1. The results are shown in Table 3. As in Example 2-1, the hot-water treated samples of the vertical form-fill-seal bags (2-2-3) to (2-13-3) showed no appearance defect such as delamination. The hot-water treated samples of the vertical form-fill-seal bags (C2-1-3) to (C2-5-3) showed an appearance defect attributed to delamination.

subjected to retorting were measured. The results are shown in Table 4. Another flat pouch (3-1-3) was filled with 100 mL of water. The flat pouch obtained was then subjected to retorting (hot water retaining method) under the same conditions as in Example 1-1. Immediately after the hot water treatment, a measurement sample was cut out from the flat pouch, and the oxygen transmission rate, moisture permeability, and T-peel strength of the sample were measured by the methods previously described. The results are shown in Table 4. No appearance defect such as delamination was observed.

TABLE 3

|  | Vertical form-fill-seal bag No. | Multilayer structure No. | Oxygen transmission rate | | Moisture permeability | | Peel strength |
|---|---|---|---|---|---|---|---|
|  |  |  | Before retorting (mL/(m² · day · atm)) | After retorting (mL/(m² · day · atm)) | Before retorting (g/(m² · day)) | After retorting (g/(m² · day)) | After retorting (g/15 mm) |
| Example 2-1 | 2-1-3 | 1-1-2 | 0.21 | 0.22 | 0.2 | 0.3 | 350 |
| Example 2-2 | 2-2-3 | 1-2-2 | 0.22 | 0.23 | 0.2 | 0.2 | 190 |
| Example 2-3 | 2-3-3 | 1-3-2 | 0.22 | 0.22 | 0.2 | 0.2 | 300 |
| Example 2-4 | 2-4-3 | 1-4-2 | 0.30 | 0.31 | 0.3 | 0.4 | 370 |
| Example 2-5 | 2-5-3 | 1-5-2 | 1.39 | 1.42 | 1.3 | 1.3 | 380 |
| Example 2-6 | 2-6-3 | 1-6-2 | 0.21 | 0.22 | 0.2 | 0.2 | 300 |
| Example 2-7 | 2-7-3 | 1-7-2 | 0.24 | 0.25 | 0.2 | 0.2 | 360 |
| Example 2-8 | 2-8-3 | 1-8-2 | 0.21 | 0.21 | 0.2 | 0.2 | 260 |
| Example 2-9 | 2-9-3 | 1-9-2 | 0.23 | 0.24 | 0.2 | 0.2 | 300 |
| Example 2-10 | 2-10-3 | 1-10-2 | 0.34 | 0.35 | 0.2 | 0.2 | 120 |
| Example 2-11 | 2-11-3 | 1-11-2 | 0.20 | 0.20 | 0.2 | 0.2 | 380 |
| Example 2-12 | 2-12-3 | 1-12-2 | 0.20 | 0.20 | 0.2 | 0.2 | 120 |
| Example 2-13 | 2-13-3 | 1-13-2 | 0.21 | 0.20 | 0.2 | 0.2 | 380 |
| Comparative Example 2-1 | C2-1-3 | C1-1-2 | 0.20 | 0.21 | 0.2 | 0.2 | 20 |
| Comparative Example 2-2 | C2-2-3 | C1-2-2 | 0.20 | 0.20 | 0.2 | 0.2 | 50 |
| Comparative Example 2-3 | C2-3-3 | C1-3-2 | 0.35 | 0.38 | 0.4 | 0.4 | 10 |
| Comparative Example 2-4 | C2-4-3 | C1-4-2 | 0.26 | 0.27 | 0.4 | 0.4 | 10 |
| Comparative Example 2-5 | C2-5-3 | C1-5-2 | 1.07 | 1.13 | 0.9 | 1.3 | 10 |

[Example 3] Flat Pouch

Example 3-1

The multilayer structure (1-1-2) as produced in Example 1-1 was cut into two pieces having a size of 120 mm×120 mm, and the two pieces of the multilayer structure were stacked together in such a manner that the CPP layers were located interiorly. The resulting rectangular stack was heat-sealed at its three outer edges with a seal width of 5 mm to form a flat pouch (3-1-3). A measurement sample was cut out from the flat pouch (3-1-3), and the oxygen transmission rate and moisture permeability of the sample yet to be Examples 3-2 to 3-13 and Comparative Examples 3-1 to 3-5

Flat pouches (3-2-3) to (3-13-3) and (C3-1-3) to (C3-5-3) were produced in the same manner as in the production of the flat pouch (3-1-3) of Example 3-1, except for using, instead of the multilayer structure (1-1-2), the multilayer structures (1-2-2) to (1-13-2) and (C1-1-2) to (C1-5-2) as produced in Examples 1-2 to 1-13 and Comparative Examples 1-1 to 1-5. For the flat pouches obtained, the various properties were measured in the same manner as in Example 3-1. The results are shown in Table 4. The flat pouches (3-2-3) to (3-13-3) showed no appearance defect such as delamination. The flat pouches (C3-1-3) to (C3-5-3) showed an appearance defect attributed to delamination.

TABLE 4

|  | Flat pouch No. | Multilayer structure No. | Oxygen transmission rate | | Moisture permeability | | Peel strength |
|---|---|---|---|---|---|---|---|
|  |  |  | Before retorting (mL/(m² · day · atm)) | After retorting (mL/(m² · day · atm)) | Before retorting (g/(m² · day)) | After retorting (g/(m² · day)) | After retorting (g/15 mm) |
| Example 3-1 | 3-1-3 | 1-1-2 | 0.20 | 0.22 | 0.2 | 0.2 | 310 |
| Example 3-2 | 3-2-3 | 1-2-2 | 0.22 | 0.23 | 0.2 | 0.3 | 190 |

TABLE 4-continued

|  | Flat pouch No. | Multilayer structure No. | Oxygen transmission rate | | Moisture permeability | | Peel strength |
|---|---|---|---|---|---|---|---|
|  |  |  | Before retorting | After retorting | Before retorting | After retorting | After retorting |
|  |  |  | (mL/(m$^2$ · day · atm)) | | (g/(m$^2$ · day)) | | (g/15 mm) |
| Example 3-3 | 3-3-3 | 1-3-2 | 0.22 | 0.22 | 0.2 | 0.2 | 300 |
| Example 3-4 | 3-4-3 | 1-4-2 | 0.30 | 0.30 | 0.3 | 0.4 | 360 |
| Example 3-5 | 3-5-3 | 1-5-2 | 1.43 | 1.45 | 1.3 | 1.4 | 370 |
| Example 3-6 | 3-6-3 | 1-6-2 | 0.21 | 0.22 | 0.2 | 0.2 | 350 |
| Example 3-7 | 3-7-3 | 1-7-2 | 0.24 | 0.24 | 0.2 | 0.2 | 360 |
| Example 3-8 | 3-8-3 | 1-8-2 | 0.21 | 0.21 | 0.2 | 0.2 | 260 |
| Example 3-9 | 3-9-3 | 1-9-2 | 0.23 | 0.23 | 0.2 | 0.2 | 290 |
| Example 3-10 | 3-10-3 | 1-10-2 | 0.34 | 0.35 | 0.2 | 0.2 | 120 |
| Example 3-11 | 3-11-3 | 1-11-2 | 0.20 | 0.20 | 0.2 | 0.2 | 380 |
| Example 3-12 | 3-12-3 | 1-12-2 | 0.20 | 0.20 | 0.2 | 0.2 | 120 |
| Example 3-13 | 3-13-3 | 1-13-2 | 0.21 | 0.20 | 0.2 | 0.2 | 370 |
| Comparative Example 3-1 | C3-1-3 | C1-1-2 | 0.21 | 0.21 | 0.2 | 0.2 | 30 |
| Comparative Example 3-2 | C3-2-3 | C1-2-2 | 0.20 | 0.20 | 0.2 | 0.2 | 50 |
| Comparative Example 3-3 | C3-3-3 | C1-3-2 | 0.36 | 0.38 | 0.4 | 0.4 | 10 |
| Comparative Example 3-4 | C3-4-3 | C1-4-2 | 0.26 | 0.27 | 0.4 | 0.4 | 10 |
| Comparative Example 3-5 | C3-5-3 | C1-5-2 | 1.10 | 1.15 | 0.9 | 1.4 | 10 |

[Example 4] Infusion Bag

Example 4-1

Two 120 mm×100 mm pieces of multilayer structure were cut out from the multilayer structure (1-1-2) as produced in Example 1-1. The two cut-out pieces of multilayer structure were then stacked together in such a manner that the CPP layers were located interiorly. The periphery of the resulting stack was heat-sealed, and a spout (plug member) made of polypropylene was attached by heat sealing. In this way, an infusion bag (4-1-3) having the same configuration as that shown in FIG. 3 was produced. A measurement sample was cut out from the infusion bag (4-1-3), and the oxygen transmission rate and moisture permeability of the sample yet to be subjected to retorting were measured. The results are shown in Table 5. Another infusion bag (4-1-3) was filled with 100 mL of water, and subjected to retorting (hot water retaining method) under the same conditions as in Example 1-1. Immediately after the hot water treatment, a measurement sample was cut out from the infusion bag, and the oxygen transmission rate, moisture permeability, and T-peel strength of the sample were measured by the methods previously described. The results are shown in Table 5. No appearance defect such as delamination was observed.

Examples 4-2 to 4-13 and Comparative Examples 4-1 to 4-5

Infusion bags (4-2-3) to (4-13-3) and (C4-1-3) to (C4-5-3) were produced in the same manner as in the production of the infusion bag (4-1-3) of Example 4-1, except for using, instead of the multilayer structure (1-1-2), the multilayer structures (1-2-2) to (1-13-2) and (C1-1-2) to (C1-5-2) as produced in Examples 1-2 to 1-13 and Comparative Examples 1-1 to 1-5. For the infusion bags obtained, the various properties were measured in the same manner as in Example 4-1. The results are shown in Table 5. The infusion bags (4-2-3) to (4-13-3) showed no appearance defect such as delamination. The infusion bags (C4-1-3) to (C4-5-3) showed an appearance defect attributed to delamination.

TABLE 5

|  | Infusion bag No. | Multilayer structure No. | Oxygen transmission rate | | Moisture permeability | | Peel strength |
|---|---|---|---|---|---|---|---|
|  |  |  | Before retorting | After retorting | Before retorting | After retorting | After retorting |
|  |  |  | (mL/(m$^2$ · day · atm)) | | (g/(m$^2$ · day)) | | (g/15 mm) |
| Example 4-1 | 4-1-3 | 1-1-2 | 0.20 | 0.22 | 0.2 | 0.2 | 300 |
| Example 4-2 | 4-2-3 | 1-2-2 | 0.22 | 0.23 | 0.2 | 0.3 | 200 |
| Example 4-3 | 4-3-3 | 1-3-2 | 0.22 | 0.22 | 0.2 | 0.2 | 300 |
| Example 4-4 | 4-4-3 | 1-4-2 | 0.30 | 0.31 | 0.3 | 0.4 | 360 |
| Example 4-5 | 4-5-3 | 1-5-2 | 1.43 | 1.46 | 1.3 | 1.4 | 370 |
| Example 4-6 | 4-6-3 | 1-6-2 | 0.21 | 0.22 | 0.2 | 0.2 | 350 |
| Example 4-7 | 4-7-3 | 1-7-2 | 0.24 | 0.25 | 0.2 | 0.2 | 360 |
| Example 4-8 | 4-8-3 | 1-8-2 | 0.21 | 0.22 | 0.2 | 0.2 | 270 |
| Example 4-9 | 4-9-3 | 1-9-2 | 0.23 | 0.24 | 0.2 | 0.2 | 290 |
| Example 4-10 | 4-10-3 | 1-10-2 | 0.34 | 0.35 | 0.2 | 0.2 | 120 |
| Example 4-11 | 4-11-3 | 1-11-2 | 0.20 | 0.21 | 0.2 | 0.2 | 360 |
| Example 4-12 | 4-12-3 | 1-12-2 | 0.20 | 0.20 | 0.2 | 0.2 | 120 |

TABLE 5-continued

|  | Infusion bag No. | Multilayer structure No. | Oxygen transmission rate | | Moisture permeability | | Peel strength |
|---|---|---|---|---|---|---|---|
|  |  |  | Before retorting | After retorting | Before retorting | After retorting | After retorting |
|  |  |  | (mL/(m$^2$ · day · atm)) | | (g/(m$^2$ · day)) | | (g/15 mm) |
| Example 4-13 | 4-13-3 | 1-13-2 | 0.21 | 0.20 | 0.2 | 0.2 | 370 |
| Comparative Example 4-1 | C4-1-3 | C1-1-2 | 0.20 | 0.21 | 0.2 | 0.2 | 30 |
| Comparative Example 4-2 | C4-2-3 | C1-2-2 | 0.20 | 0.21 | 0.2 | 0.2 | 50 |
| Comparative Example 4-3 | C4-3-3 | C1-3-2 | 0.35 | 0.38 | 0.4 | 0.4 | 20 |
| Comparative Example 4-4 | C4-4-3 | C1-4-2 | 0.26 | 0.27 | 0.4 | 0.4 | 10 |
| Comparative Example 4-5 | C4-5-3 | C1-5-2 | 1.10 | 1.14 | 0.8 | 1.4 | 10 |

[Example 5] Container Lid

Example 5-1

A 100-mm-diameter circular piece of multilayer structure was cut out from the multilayer structure (1-1-2) as produced in Example 1-1, and was used as a lid for a container. A flanged container ("Hi-Retoflex" (registered trademark) "HR78-84" (product name) manufactured by Toyo Seikan Co., Ltd.) was prepared for use as a container body. This container has the shape of a 30-mm-high cup whose top surface has a diameter of 78 mm. The top surface of the container is open, and the width of the flange portion formed along the periphery of the top surface is 6.5 mm. The container is made up of a three-layered product having a configuration of "olefin layer/steel layer/olefin layer". Next, the container body was almost completely filled with water, and the lid was heat-sealed to the flange portion, thus obtaining a lidded container (5-1-3). In this heat-sealing of the lid, the lid was set in such a manner that the CPP layer of the lid was in contact with the flange portion. A measurement sample in the shape of a square 4.5 cm on a side was cut out from the lid of the lidded container (5-1-3), and placed on a 10-cm-square aluminum foil (of 30 μm thickness) to cover a 2.0-cm-diameter circular hole made in the foil. The gap between the sample and the aluminum foil was sealed with a two-component curable epoxy adhesive. Using the sample, the oxygen transmission rate and moisture permeability were measured before retorting. The results are shown in Table 6. Another lidded container (5-1-3) was then subjected to retorting (hot water retaining method) under the same conditions as in Example 1-1. Immediately after the hot water treatment, a measurement sample was cut out from the lid, and the oxygen transmission rate and moisture permeability of the sample were measured in the same manner as before the retorting. The T-peel strength was also measured by the method previously described. The results are shown in Table 6. No appearance defect such as delamination was observed.

Examples 5-2 to 5-13 and Comparative Examples 5-1 to 5-5

Lidded containers (5-2-3) to (5-13-3) and (C5-1-3) to (C5-5-3) were produced in the same manner as in the production of the lidded container (5-1-3) of Example 5-1, except for using, instead of the multilayer structure (1-1-2), the multilayer structures (1-2-2) to (1-13-2) as produced in Examples 1-2 to 1-13 and the multilayer structures (C1-1-2) to (C1-5-2) as produced in Comparative Examples 1-1 to 1-5. For the lids of the lidded containers obtained, the various properties were measured in the same manner as in Example 5-1. The results are shown in Table 6. The lidded containers (5-2-3) to (5-13-3) showed no appearance defect such as delamination. The lidded containers (C5-1-3) to (C5-5-3) showed an appearance defect attributed to delamination.

TABLE 6

|  | Lidded container No. | Multilayer structure No. | Oxygen transmission rate | | Moisture permeability | | Peel strength |
|---|---|---|---|---|---|---|---|
|  |  |  | Before retorting | After retorting | Before retorting | After retorting | After retorting |
|  |  |  | (mL/(m$^2$ · day · atm)) | | (g/(m$^2$ · day)) | | (g/15 mm) |
| Example 5-1 | 5-1-3 | 1-1-2 | 0.20 | 0.22 | 0.2 | 0.2 | 310 |
| Example 5-2 | 5-2-3 | 1-2-2 | 0.22 | 0.24 | 0.2 | 0.2 | 200 |
| Example 5-3 | 5-3-3 | 1-3-2 | 0.22 | 0.23 | 0.2 | 0.2 | 300 |
| Example 5-4 | 5-4-3 | 1-4-2 | 0.30 | 0.32 | 0.3 | 0.3 | 360 |
| Example 5-5 | 5-5-3 | 1-5-2 | 1.43 | 1.45 | 1.3 | 1.3 | 380 |
| Example 5-6 | 5-6-3 | 1-6-2 | 0.21 | 0.23 | 0.2 | 0.2 | 350 |
| Example 5-7 | 5-7-3 | 1-7-2 | 0.24 | 0.25 | 0.2 | 0.2 | 360 |
| Example 5-8 | 5-8-3 | 1-8-2 | 0.21 | 0.22 | 0.2 | 0.2 | 270 |
| Example 5-9 | 5-9-3 | 1-9-2 | 0.23 | 0.24 | 0.2 | 0.2 | 300 |
| Example 5-10 | 5-10-3 | 1-10-2 | 0.34 | 0.36 | 0.2 | 0.2 | 110 |
| Example 5-11 | 5-11-3 | 1-11-2 | 0.21 | 0.21 | 0.2 | 0.2 | 370 |
| Example 5-12 | 5-12-3 | 1-12-2 | 0.20 | 0.20 | 0.2 | 0.2 | 120 |

TABLE 6-continued

| | Lidded container No. | Multilayer structure No. | Oxygen transmission rate | | Moisture permeability | | Peel strength |
| | | | Before retorting (mL/(m² · day · atm)) | After retorting | Before retorting (g/(m² · day)) | After retorting | After retorting (g/15 mm) |
|---|---|---|---|---|---|---|---|
| Example 5-13 | 5-13-3 | 1-13-2 | 0.21 | 0.20 | 0.2 | 0.2 | 370 |
| Comparative Example 5-1 | C5-1-3 | C1-1-2 | 0.20 | 0.21 | 0.2 | 0.2 | 20 |
| Comparative Example 5-2 | C5-2-3 | C1-2-2 | 0.20 | 0.22 | 0.2 | 0.2 | 50 |
| Comparative Example 5-3 | C5-3-3 | C1-3-2 | 0.35 | 0.38 | 0.4 | 0.4 | 10 |
| Comparative Example 5-4 | C5-4-3 | C1-4-2 | 0.26 | 0.28 | 0.4 | 0.4 | 10 |
| Comparative Example 5-5 | C5-5-3 | C1-5-2 | 1.10 | 1.14 | 0.8 | 1.5 | 10 |

[Example 6] in-Mold Labeled Container

Example 6-1

A two-component adhesive was applied to two CPP 100s using a bar coater so that the dry thickness would be 3 μm, and the adhesive was dried. The two-component adhesive used was a two-component reactive polyurethane adhesive composed of "A-525S" of "TAKELAC" (registered trademark) manufactured by Mitsui Chemicals, Inc. and "A-50" of "TAKENATE" (registered trademark) manufactured by Mitsui Chemicals, Inc. Next, the two CPP 100s and the multilayer structure (1-1-1) of Example 1-1 were laminated together, and the resulting laminate was allowed to stand at 40° C. for 5 days for aging. In this way, a multilayer label (6-1-2) having a configuration of "CPP 100/adhesive layer/base (X-1)/layer (Y-1)/adhesive layer/CPP 100" was obtained. The oxygen transmission rate and moisture permeability of the multilayer label (6-1-2) obtained were measured by the methods previously described. The results are shown in Table 7.

The multilayer label (6-1-2) was cut to conform to the inner wall surface of a female mold member of a container-forming mold, and attached to the inner wall surface of the female mold member. A male mold member was then pressed into the female mold member. Next, molten polypropylene ("EA7A" of "NOVATEC" (registered trademark) manufactured by Japan Polypropylene Corporation) was injected into the cavity between the male mold member and female mold member at 220° C. Injection molding was carried out in this way to form the intended in-mold labeled container (6-1-3). The container body had a thickness of 700 μm and a surface area of 83 cm². The entire exterior of the container was covered with the multilayer label (6-1-2); namely, the multilayer label (6-1-2) overlapped the seam so that the exterior of the container was free of any area that was not covered by the multilayer label (6-1-2). The multilayer label showed no delamination, and the in-mold labeled container (6-1-3) had good appearance.

Examples 6-2 to 6-13 and Comparative Examples 6-1 to 6-5

Multilayer labels (6-2-2) to (6-13-2) and (C6-1-2) to (C6-5-2) were produced in the same manner as in the production of the multilayer label (6-1-2) of Example 6-1, except for using, instead of the multilayer structure (1-1-1), the multilayer structures (1-2-1) to (1-13-1) and (C1-1-1) to (C1-5-1) as produced in Examples 1-2 to 1-13 and Comparative Examples 1-1 to 1-5. Next, in-mold labeled containers (6-2-3) to (6-13-3) and (C6-1-3) to (C6-5-3) were produced in the same manner as in the production of the in-mold labeled container (6-1-3) of Example 6-1, except for using the multilayer labels (6-2-2) to (6-13-2) and (C6-1-2) to (C6-5-2) instead of the multilayer label (6-1-2) of Example 6-1. For the multilayer labels obtained, the various properties were measured in the same manner as in Example 6-1. The results are shown in Table 7. The in-mold labeled containers (6-2-3) to (6-13-3) had good appearance. By contrast, the in-mold labeled containers (C6-1-3) to (C6-5-3) were observed to suffer from delamination.

TABLE 7

| | Multilayer label No. | Multilayer structure No. | Oxygen transmission rate (mL/ (m² · day · atm)) | Moisture permeability (g/ (m² · day)) |
|---|---|---|---|---|
| Example 6-1 | 6-1-2 | 1-1-1 | 0.20 | 0.2 |
| Example 6-2 | 6-2-2 | 1-2-1 | 0.22 | 0.2 |
| Example 6-3 | 6-3-2 | 1-3-1 | 0.21 | 0.2 |
| Example 6-4 | 6-4-2 | 1-4-1 | 0.30 | 0.3 |
| Example 6-5 | 6-5-2 | 1-5-1 | 1.40 | 1.3 |
| Example 6-6 | 6-6-2 | 1-6-1 | 0.20 | 0.2 |
| Example 6-7 | 6-7-2 | 1-7-1 | 0.24 | 0.2 |
| Example 6-8 | 6-8-2 | 1-8-1 | 0.21 | 0.2 |
| Example 6-9 | 6-9-2 | 1-9-1 | 0.23 | 0.2 |
| Example 6-10 | 6-10-2 | 1-10-1 | 0.33 | 0.2 |
| Example 6-11 | 6-11-2 | 1-11-1 | 0.21 | 0.2 |
| Example 6-12 | 6-12-2 | 1-12-1 | 0.20 | 0.2 |
| Example 6-13 | 6-13-2 | 1-13-1 | 0.21 | 0.2 |
| Comparative Example 6-1 | C6-1-2 | C1-1-1 | 0.20 | 0.2 |
| Comparative Example 6-2 | C6-2-2 | C1-2-1 | 0.21 | 0.2 |
| Comparative Example 6-3 | C6-3-2 | C1-3-1 | 0.35 | 0.4 |
| Comparative Example 6-4 | C6-4-2 | C1-4-1 | 0.27 | 0.4 |
| Comparative Example 6-5 | C6-5-2 | C1-5-1 | 1.12 | 0.9 |

[Example 7] Extrusion Coating Lamination

Example 7-1

An adhesive layer was formed on the layer (Y-1-1) of the multilayer structure (1-1-1) of Example 1-1, and a polyethylene resin (having a density of 0.917 g/cm³ and a melt flow rate of 8 g/10 min) was then applied onto the adhesive layer by extrusion coating lamination at 295° C. in such a manner that the applied resin had a thickness of 20 μm. In this way, a laminate (7-1-2) having a configuration of "base (X-1)/layer (Y-1-1)/adhesive layer/polyethylene layer" was obtained. The adhesive layer was formed by applying a two-component adhesive using a bar coater so that the dry thickness would be 0.3 μm, and then by drying the adhesive. This two-component adhesive used was a two-component reactive polyurethane adhesive composed of "A-3210" of "TAKELAC" (registered trademark) manufactured by Mitsui Chemicals, Inc. and "A-3070" of "TAKENATE" (registered trademark) manufactured by Mitsui Chemicals, Inc. The oxygen transmission rate and moisture permeability of the laminate (7-1-2) were measured by the methods previously described. The results are shown in Table 8. The laminate (7-1-2) showed no appearance defect such as delamination when wound into a roll.

Examples 7-2 to 7-13 and Comparative Examples 7-1 to 7-5

Laminates (7-2-2) to (7-13-2) and (C7-1-2) to (C7-5-2) were produced in the same manner as in the production of the laminate (7-1-2) of Example 7-1, except for using the multilayer structures (1-2-1) to (1-13-1) and (C1-1-1) to (C1-5-1) of Examples 1-2 to 1-13 and Comparative Examples 1-1 to 1-5 instead of the multilayer structure (1-1-1). For the laminates obtained, the various properties were measured in the same manner as in Example 7-1. The results are shown in Table 8. The laminates (7-2-2) to (7-13-2) showed no appearance defect such as delamination when wound into rolls. The laminates (C7-1-2) to (C7-5-2) were observed to suffer from partial delamination when wound into rolls.

TABLE 8

| Laminate No. | Multilayer structure No. | Oxygen transmission rate (mL/(m² · day · atm)) | Moisture permeability (g/(m² · day)) |
| --- | --- | --- | --- |
| Example 7-1 | 7-1-2 | 1-1-1 | 0.20 | 0.2 |
| Example 7-2 | 7-2-2 | 1-2-1 | 0.22 | 0.2 |
| Example 7-3 | 7-3-2 | 1-3-1 | 0.21 | 0.2 |
| Example 7-4 | 7-4-2 | 1-4-1 | 0.30 | 0.3 |
| Example 7-5 | 7-5-2 | 1-5-1 | 1.38 | 1.3 |
| Example 7-6 | 7-6-2 | 1-6-1 | 0.20 | 0.2 |
| Example 7-7 | 7-7-2 | 1-7-1 | 0.26 | 0.3 |
| Example 7-8 | 7-8-2 | 1-8-1 | 0.21 | 0.2 |
| Example 7-9 | 7-9-2 | 1-9-1 | 0.23 | 0.2 |
| Example 7-10 | 7-10-2 | 1-10-1 | 0.31 | 0.2 |
| Example 7-11 | 7-11-2 | 1-11-1 | 0.20 | 0.2 |
| Example 7-12 | 7-12-2 | 1-12-1 | 0.20 | 0.2 |
| Example 7-13 | 7-13-2 | 1-13-1 | 0.20 | 0.2 |
| Comparative Example 7-1 | C7-1-2 | C1-1-1 | 0.22 | 0.2 |
| Comparative Example 7-2 | C7-2-2 | C1-2-1 | 0.21 | 0.2 |
| Comparative Example 7-3 | C7-3-2 | C1-3-1 | 0.36 | 0.4 |
| Comparative Example 7-4 | C7-4-2 | C1-4-1 | 0.26 | 0.4 |
| Comparative Example 7-5 | C7-5-2 | C1-5-1 | 1.15 | 0.9 |

[Example 8] Influence of Contained Material

Example 8-1

A flat pouch (3-1-3) as produced in Example 3-1 was filled with 500 mL of a 1.5% aqueous ethanol solution, and subjected to retorting using a retorting apparatus (Flavor Ace RCS-60, manufactured by HISAKA WORKS, LTD.) in hot water at 120° C. and 0.15 MPaG for 30 minutes. A measurement sample was cut out from the flat pouch subjected to retorting, and the oxygen transmission rate of the sample was measured. The oxygen transmission rate of the sample was 0.20 mL/(m²·day·atm).

Examples 8-2 to 8-9

Flat pouches (3-1-3) were subjected to retorting in the same manner as in Example 8-1, except for using other materials instead of the 1.5% aqueous ethanol solution and filling each flat pouch (3-1-3) with 500 mL of one of the other materials. A measurement sample was cut out from each flat pouch subjected to retorting, and the oxygen transmission rate of the sample was measured. The other materials used were a 1.0% aqueous ethanol solution (Example 8-2), vinegar (Example 8-3), an aqueous citric acid solution with a pH of 2 (Example 8-4), an edible oil (Example 8-5), ketchup (Example 8-6), soy sauce (Example 8-7), and a ginger paste (Example 8-8). In any case, the oxygen transmission rate of the sample subjected to retorting was 0.20 mL/(m²·day·atm). In addition, a lidded container (5-1-3) as produced in Example 5-1 was almost completely filled with mikan in syrup and was subjected to retorting in the same manner as in Example 8-1 (Example 8-9). A measurement sample was cut out from the lid of the lidded container subjected to retorting, and the oxygen transmission rate of the sample was measured. The oxygen transmission rate was 0.20 mL/(m²·day·atm).

As clearly demonstrated by Examples 8-1 to 8-9, the packaging materials of the present invention exhibited good barrier performance even after undergoing retorting with various food products contained therein.

[Example 9] Vacuum Insulator

Example 9-1

The two-component reactive polyurethane adhesive as used in Example 6-1 was applied onto a CPP 60 so that the dry thickness would be 3 μm, and the adhesive was dried to form an adhesive layer on the CPP 60. This CPP was bonded to the base (X-1) of the multilayer structure (1-1-2) as produced in Example 1-1 to obtain a layered product (9-1-1). The above two-component reactive polyurethane adhesive was then applied onto a separately-prepared ONY 15 so that the dry thickness would be 3 μm, and the adhesive was dried to form an adhesive layer on the ONY 15. This ONY 15 and the layered product (9-1-1) were bonded together to obtain a multilayer structure (9-1-2) having a configuration of "CPP 60/adhesive layer/multilayer structure (1-1-2)/adhesive layer/ONY 15".

The multilayer structure (9-1-2) was cut to give two laminates having a size of 70 cm×30 cm. The two laminates were stacked together in such a manner that the CPP layers would form inner surfaces of a bag to be produced, and the stack was heat-sealed at its three sides with a seal width of 10 mm. A three-side-seal bag was thus produced. Next, a heat-insulating core material was put into the three-side-seal bag through its opening, and the three-side-seal bag was hermetically closed using a vacuum packaging machine so that the internal pressure was 10 Pa at 20° C. In this way, a vacuum insulator (9-1-3) was obtained. The heat-insulating core material used was a fine silica powder. The vacuum insulator (9-1-3) was left at 40° C. and 15% RH for 360 days, after which the internal pressure of the vacuum insulator was measured using a Pirani gauge. The measured pressure was 37.0 Pa.

The vacuum insulator (9-1-3) was subjected to a durability test (damp heat test) in which it was stored at atmospheric pressure, 85° C., and 85% RH for 1,000 hours using a thermo-hygrostat. Measurement samples were cut out from the vacuum insulator before and after the damp heat test, and the oxygen transmission rate and moisture permeability were measured for the samples. The T-peel strength of the sample subjected to the damp heat test was also measured by the method previously described. The results are shown in Table 9. No appearance defect such as delamination was observed.

Examples 9-2 to 9-13 and Comparative Examples 9-1 to 9-5

Vacuum insulators (9-2-3) to (9-13-3) and (C9-1-3) to (C9-5-3) were produced in the same manner as in the production of the vacuum insulator (9-1-3) of Example 9-1, except for using the multilayer structures (1-2-2) to (1-13-2) and (C1-1-2) to (C1-5-2) of Examples 1-2 to 1-13 and Comparative Examples 1-1 to 1-5 instead of the multilayer structure (1-1-2). For the vacuum insulators obtained, the various properties were measured in the same manner as in Example 9-1. The results are shown in Table 9. The vacuum insulators (9-2-3) to (9-13-3) showed no appearance defect such as delamination. By contrast, the vacuum insulators (C9-1-3) to (C9-5-3) were observed to suffer from delamination.

an acrylic resin film (thickness: 50 μm) was laminated onto the adhesive layer to obtain a layered product. Subsequently, an adhesive layer was formed on the base (X-1) of the multilayer structure (1-1-1) of the layered product, and the layered product and a PET 50 were then laminated together. In this way, a protective sheet (10-1-2) having a configuration of "PET 50/adhesive layer/base (X-1)/layer (Y-1-1)/adhesive layer/acrylic resin layer" was obtained. The two adhesive layers were each formed by applying a two-component adhesive so that the dry thickness would be 3 μm and then by drying the adhesive. The two-component adhesive used was a two-component reactive polyurethane adhesive composed of "A-1102" of "TAKELAC" (registered trademark) manufactured by Mitsui Chemicals, Inc. and "A-3070" of "TAKENATE" (registered trademark) manufactured by Mitsui Chemicals, Inc. The oxygen transmission rate and moisture permeability of the protective sheet (10-1-2) obtained were measured. The results are shown in Table 10.

Subsequently, the protective sheet (10-1-2) obtained was examined for durability by performing a test (damp heat test) in which the protective sheet was stored at atmospheric pressure, 85° C., and 85% RH for 1,000 hours using a thermo-hygrostat. The results of measurement of the oxygen transmission rate and moisture permeability of the protective sheet subjected to the test are shown in Table 10. The result of adhesion evaluation conducted on the protective sheet is also shown in Table 10. No appearance defect such as delamination was observed.

TABLE 9

|  | Vacuum insulator No. | Multilayer structure No. | Oxygen transmission rate | | Moisture permeability | | Peel strength |
|---|---|---|---|---|---|---|---|
|  |  |  | Before damp heating (mL/(m² · day · atm)) | After damp heating | Before damp heating (g/(m² · day)) | After damp heating | After damp heating (g/15 mm) |
| Example 9-1 | 9-1-3 | 9-1-2 | 0.20 | 0.21 | 0.2 | 0.2 | 520 |
| Example 9-2 | 9-2-3 | 9-2-2 | 0.22 | 0.22 | 0.2 | 0.2 | 470 |
| Example 9-3 | 9-3-3 | 9-3-2 | 0.21 | 0.22 | 0.2 | 0.2 | 500 |
| Example 9-4 | 9-4-3 | 9-4-2 | 0.30 | 0.32 | 0.3 | 0.3 | 530 |
| Example 9-5 | 9-5-3 | 9-5-2 | 1.38 | 1.41 | 1.3 | 1.3 | 540 |
| Example 9-6 | 9-6-3 | 9-6-2 | 0.22 | 0.22 | 0.2 | 0.2 | 550 |
| Example 9-7 | 9-7-3 | 9-7-2 | 0.25 | 0.26 | 0.2 | 0.2 | 560 |
| Example 9-8 | 9-8-3 | 9-8-2 | 0.21 | 0.21 | 0.2 | 0.2 | 490 |
| Example 9-9 | 9-9-3 | 9-9-2 | 0.22 | 0.23 | 0.2 | 0.2 | 520 |
| Example 9-10 | 9-10-3 | 9-10-2 | 0.32 | 0.33 | 0.2 | 0.2 | 320 |
| Example 9-11 | 9-11-3 | 9-11-2 | 0.21 | 0.21 | 0.2 | 0.2 | 560 |
| Example 9-12 | 9-12-3 | 9-12-2 | 0.20 | 0.20 | 0.2 | 0.2 | 310 |
| Example 9-13 | 9-13-3 | 9-13-2 | 0.21 | 0.20 | 0.2 | 0.2 | 570 |
| Comparative Example 9-1 | C9-1-3 | C9-1-2 | 0.20 | 0.20 | 0.2 | 0.2 | 110 |
| Comparative Example 9-2 | C9-2-3 | C9-2-2 | 0.20 | 0.20 | 0.2 | 0.2 | 140 |
| Comparative Example 9-3 | C9-3-3 | C9-3-2 | 0.34 | 0.37 | 0.4 | 0.4 | 100 |
| Comparative Example 9-4 | C9-4-3 | C9-4-2 | 0.37 | 0.38 | 0.4 | 0.4 | 110 |
| Comparative Example 9-5 | C9-5-3 | C9-5-2 | 1.37 | 1.38 | 0.9 | 1.0 | 110 |

[Example 10] Protective Sheet

Example 10-1

An adhesive layer was formed on the layer (Y-1-1) of the multilayer structure (1-1-1) as produced in Example 1-1, and Examples 10-2 to 10-13 and Comparative Examples 10-1 to 10-5

Protective sheets (10-2-2) to (10-13-2) and (C10-1-2) to (C10-5-2) were produced in the same manner as in the production of the protective sheet (10-1-2) of Example 10-1, except for using the multilayer structures (1-2-1) to (1-13-1) and (C1-1-1) to (C1-5-1) of Examples 1-2 to 1-13 and Comparative Examples 1-1 to 1-5 instead of the multilayer structure (1-1-1). The protective sheets obtained were evaluated. The results are shown in Table 10. As in Example 10-1, the protective sheets (10-2-2) to (10-13-2) showed no appearance defect such as delamination after the damp heat test. By contrast, the protective sheets (C10-1-2) to (C10-5-2) suffered from partial delamination and showed an appearance defect as a result of the damp heat test.

multilayer structure of the present invention makes it possible to obtain a good packaging material capable of maintaining good gas barrier properties and water vapor barrier properties even after retorting under harsh conditions. The present invention is also applicable to a protective sheet including a multilayer structure and an electronic device including the protective sheet. The present invention makes it possible to obtain an electronic device including a protective sheet including a multilayer structure that has good gas barrier properties and good water vapor barrier proper-

TABLE 10

| | Protective sheet No. | Oxygen transmission rate | | Moisture permeability | | Peel strength | Appearance after damp heat test |
|---|---|---|---|---|---|---|---|
| | | Before damp heat test ($mL/(m^2 \cdot day \cdot atm)$) | After damp heat test | Before damp heat test ($g/(m^2 \cdot day)$) | After damp heat test | After damp heat test (g/15 mm) | |
| Example 10-1 | 10-1-2 | 0.20 | 0.21 | 0.2 | 0.2 | 520 | A |
| Example 10-2 | 10-2-2 | 0.22 | 0.22 | 0.2 | 0.2 | 460 | A |
| Example 10-3 | 10-3-2 | 0.21 | 0.22 | 0.2 | 0.3 | 500 | A |
| Example 10-4 | 10-4-2 | 0.30 | 0.33 | 0.3 | 0.3 | 530 | A |
| Example 10-5 | 10-5-2 | 1.38 | 1.39 | 1.3 | 1.3 | 540 | A |
| Example 10-6 | 10-6-2 | 0.22 | 0.22 | 0.2 | 0.2 | 540 | A |
| Example 10-7 | 10-7-2 | 0.24 | 0.26 | 0.2 | 0.2 | 550 | A |
| Example 10-8 | 10-8-2 | 0.21 | 0.21 | 0.2 | 0.2 | 490 | A |
| Example 10-9 | 10-9-2 | 0.22 | 0.23 | 0.2 | 0.2 | 520 | A |
| Example 10-10 | 10-10-2 | 0.32 | 0.33 | 0.2 | 0.2 | 330 | A |
| Example 10-11 | 10-11-2 | 0.21 | 0.21 | 0.2 | 0.2 | 560 | A |
| Example 10-12 | 10-12-2 | 0.20 | 0.20 | 0.2 | 0.2 | 320 | A |
| Example 10-13 | 10-13-2 | 0.21 | 0.20 | 0.2 | 0.2 | 570 | A |
| Comparative Example 10-1 | C10-1-2 | 0.20 | 0.21 | 0.2 | 0.2 | 110 | B |
| Comparative Example 10-2 | C10-2-2 | 0.20 | 0.20 | 0.2 | 0.2 | 140 | B |
| Comparative Example 10-3 | C10-3-2 | 0.34 | 0.37 | 0.4 | 0.4 | 100 | B |
| Comparative Example 10-4 | C10-4-2 | 0.37 | 0.39 | 0.4 | 0.4 | 110 | B |
| Comparative Example 10-5 | C10-5-2 | 1.31 | 1.32 | 0.9 | 1.0 | 110 | B |

Example 10-14

A solar cell module was produced using the protective sheet (10-1-2) as obtained in Example 10-1. Specifically, first, an amorphous silicon solar cell placed on a 10-cm-square tempered glass plate was sandwiched between ethylene-vinyl acetate copolymer films with a thickness of 450 μm. The protective sheet (10-1-2) was then bonded onto one of the films in such a manner that the polyethylene terephthalate layer of the protective sheet (10-1-2) faced outwardly. In this way, a solar cell module was produced. The bonding was accomplished by vacuum drawing at 150° C. for 3 minutes, followed by compression bonding for 9 minutes. The solar cell module thus produced operated well and continued to exhibit good electrical output characteristics over a long period of time.

INDUSTRIAL APPLICABILITY

The present invention is applicable to a multilayer structure, a packaging material including the multilayer structure, and a method for producing a multilayer structure. The present invention makes it possible to obtain a multilayer structure capable of maintaining good barrier properties even after retorting and retaining good interlayer adhesion (peel strength) without suffering from appearance defects such as delamination even after retorting. The use of the ties and that retains good interlayer adhesion even at high temperature and high humidity. The present invention, therefore, makes it possible to obtain an electronic device capable of maintaining good properties not only during production and distribution but also during actual use which often lasts for a long period of time.

REFERENCE SIGNS LIST

10 Vertical form-fill-seal bag
11, 631, 632 Multilayer structure
11a Edge portion
11b Body portion
11c, 411, 412, 413, 414, 611 Edge
20 Flat pouch
360 In-mold labeled container
361, 362, 363 Multilayer label
361a Through hole
370 Container body
371 Flange portion
372 Body portion
373 Bottom portion
371a Projection
40 Electronic device
41 Electronic device body
42 Sealing material
43 Protective sheet (multilayer structure)

401 Infusion bag
420, 620 Separation barrier
431 Bag body
432 Plug member
433 Hanging hole
50 Single-lamination apparatus
51 Extruder
52 T-die
53 Cooling roll
54 Rubber roll
501 Layered product
502 Resin film
503 Laminated film (multilayer structure)
601, 602 Vacuum insulator
410a, 410b Film material
651, 652 Core material

The invention claimed is:

1. A multilayer structure comprising a base (X) and a layer (Y), wherein:
   the layer (Y) comprises an aluminum-containing compound (A) and a phosphorus compound (BH) in which a phosphorus atom having at least one hydroxy group and a polar group are bonded via an alkylene chain having 3 to 20 carbon atoms or a polyoxyalkylene chain based on an alkylene having 3 to 20 carbon atoms, and
   the aluminum-containing compound (A) is a compound (Ab) comprising a reaction product (D) of an aluminum-containing metal oxide (Aa) and an inorganic phosphorus compound (BI),
   wherein a ratio $M_{BH}/M_{BI}$ of a number of moles $M_{BH}$ of the phosphorus compound (BH) to a number of moles $M_{BI}$ of the inorganic phosphorus compound (BI) is $1.0 \times 10^{-4} \leq M_{BH}/M_{BI} \leq 2.0 \times 10^{-2}$.

2. The multilayer structure according to claim 1, wherein the polar group of the phosphorus compound (BH) is a hydroxy group.

3. The multilayer structure according to claim 1, wherein, in the phosphorus compound (BH), the phosphorus atom having the at least one hydroxy group is a functional group selected from the group consisting of a phosphoric acid group, a phosphorous acid group, a phosphonic acid group, a phosphonous acid group, a phosphinic acid group, and a phosphinous acid group.

4. The multilayer structure according to claim 1, wherein a C/Al ratio as measured by X-ray photoelectron spectroscopy (XPS) is 0.1 to 15.0 between a surface of the layer (Y) and a depth of 5 nm below the surface, the surface not being in contact with the base (X).

5. The multilayer structure according to claim 1, wherein the layer (Y) has a water contact angle of 25° to 100°.

6. The multilayer structure according to claim 1, wherein the multilayer structure has an oxygen transmission rate of 2.0 mL/(m²·day·atm) or less at 20° C. and 85% RH.

7. The multilayer structure according to claim 1, wherein the multilayer structure has a moisture permeability of 2.0 g/(m²·day) or less at 40° C. and 90/0% RH.

8. The multilayer structure according to claim 1, wherein the base (X) comprises at least one layer selected from the group consisting of a thermoplastic resin film layer and a paper layer.

9. A method for producing the multilayer structure according to claim 1, the method comprising:
   (I-1) applying a coating liquid (S1) to the base (X) to form a precursor layer of the layer (Y) on the base (X), the coating liquid (S1) containing the aluminum-containing compound (A), the inorganic phosphorus compound (BI), the phosphorus compound (BH), and a solvent, the phosphorus compound (BH) in which a phosphorus atom having at least one hydroxy group and a polar group are bonded via an alkylene chain having 3 to 20 carbon atoms or a polyoxyalkylene chain based on an alkylene having 3 to 20 carbon atoms; and
   (I-2) treating the precursor layer of the layer (Y) to form the layer (Y).

10. A method for producing the multilayer structure according to claim 1, the method comprising:
   (II-1) applying a coating liquid (S2) to the base (X) to form a precursor layer of the layer (Y), the coating liquid (S2) containing the aluminum-containing compound (A), the inorganic phosphorus compound (BI), and a solvent;
   (II-2) applying a coating liquid (T) to the precursor layer, the coating liquid (T) containing the phosphorus compound (BH) and a solvent; and
   (II-3) treating the precursor layer of the layer (Y) to form the layer (Y).

11. A packaging material, comprising the multilayer structure according to claim 1.

12. The packaging material according to claim 11, further comprising a layer formed by extrusion coating lamination.

13. The packaging material according to claim 11, being a vertical form-fill-seal bag, a vacuum packaging bag, a pouch, a laminated tube container, an infusion bag, a paper container, a strip tape, a container lid, or an in-mold labeled container.

14. A vacuum insulator comprising the packaging material according to claim 13, which is the vacuum packaging bag, wherein:
   the vacuum packaging bag contains a substance in an interior thereof,
   the substance is a core material, and
   the interior of the vacuum packaging bag has a reduced pressure.

15. A protective sheet for electronic devices, comprising the multilayer structure according to claim 1.

16. The protective sheet for electronic devices according to claim 15, being a protective sheet for protecting a surface of a photoelectric conversion device, an information display device, or a lighting device.

17. An electronic device comprising the protective sheet according to claim 15.

* * * * *